US010564968B2

(12) United States Patent
Stephens

(10) Patent No.: US 10,564,968 B2
(45) Date of Patent: Feb. 18, 2020

(54) VECTOR LOAD INSTRUCTION

(71) Applicant: ARM LIMITED, Cambridge (GB)

(72) Inventor: Nigel John Stephens, Cambridge (GB)

(73) Assignee: ARM Limited, Cambridge (GB)

( * ) Notice: Subject to any disclaimer, the term of this patent is extended or adjusted under 35 U.S.C. 154(b) by 43 days.

(21) Appl. No.: 15/759,914

(22) PCT Filed: Sep. 5, 2016

(86) PCT No.: PCT/GB2016/052727
§ 371 (c)(1),
(2) Date: Mar. 14, 2018

(87) PCT Pub. No.: WO2017/064452
PCT Pub. Date: Apr. 20, 2017

(65) Prior Publication Data
US 2018/0253310 A1    Sep. 6, 2018

(30) Foreign Application Priority Data
Oct. 14, 2015  (GB) .................................. 1518154.8

(51) Int. Cl.
*G06F 9/30* (2018.01)
*G06F 15/80* (2006.01)

(52) U.S. Cl.
CPC ........ *G06F 9/30043* (2013.01); *G06F 9/3013* (2013.01); *G06F 9/30036* (2013.01); *G06F 15/8061* (2013.01)

(58) Field of Classification Search
None
See application file for complete search history.

(56) References Cited

U.S. PATENT DOCUMENTS

| | | | |
|---|---|---|---|
| 9,672,036 B2 * | 6/2017 | Ould-Ahmed-Vall | ....................... G06F 9/30036 |
| 2002/0087846 A1 * | 7/2002 | Nickolls | ............... G06F 9/3001 712/229 |
| 2010/0325483 A1 * | 12/2010 | Gonion | ................. G06F 8/4441 714/10 |
| 2014/0237303 A1 * | 8/2014 | Bharadwaj | .......... G06F 9/30018 714/48 |

(Continued)

OTHER PUBLICATIONS

International Search Report and Written Opinion of the ISA for PCT/GB2016/052727, dated Nov. 28, 2016, 10 pages.

(Continued)

*Primary Examiner* — Eric Coleman
(74) *Attorney, Agent, or Firm* — Nixon & Vanderhye P.C.

(57) ABSTRACT

First and second types of vector load instruction are provided. For the first type, a response action is performed when an exceptional condition is detected for a load operation performed for a first active data element of at least one vector register, but when the exceptional condition is detected for an active data element other than the first active data element, the response action is suppressed and element identifying information is stored identifying the element which caused the exceptional condition. For the second type, the response action is suppressed and the element identifying information is stored when the exceptional condition arises for any active data element. This approach is useful for allowing loop speculation and loop unrolling to be used together to improve performance of vectorised code.

12 Claims, 10 Drawing Sheets

(56) References Cited

U.S. PATENT DOCUMENTS

2014/0244987 A1* 8/2014 Garbacea .................. G06F 9/30
                                                              712/244
2015/0261590 A1    9/2015 Sperber et al.

OTHER PUBLICATIONS

Combined Search Report for GB1518154.8, dated Apr. 21, 2016, 6 pages.

* cited by examiner

```
LDFF1    Zd, Pg, Xb, imm = 0
LDNF1    Zd, Pg, Xb, imm ≠ 0
```

```
LDFF1    Zd, Pg, Xb, Xoff
LDNF1    Zd, Pg, Xb, imm
```

VECTOR LOAD INSTRUCTION

This application is the U.S. national phase of International Application No. PCT/GB2016/052727 filed 5 Sep. 2016, which designated the U.S. and claims priority to GB Patent Application No. 1518154.8 filed 14 Oct. 2015, the entire contents of each of which are hereby incorporated by reference.

The present technique relates to the field of data processing. More particularly, it relates to a vector load instruction for loading data from storage locations of a data store to multiple data elements of at least one vector register.

Some data processing apparatuses may support vector processing in which a given processing operation may be performed on each data element of a vector to generate corresponding data elements of a result vector. This allows a number of different data values to be processed with a single instruction, to reduce the number of program instructions required to process a given number of data values. Vector processing can also be referred to as SIMD (single instruction, multiple data) processing. Vector load instructions may be used to load data to respective elements of at least one vector register from corresponding storage locations in a data store.

At least some examples provide an apparatus comprising:
processing circuitry to perform, in response to a vector load instruction, load operations to transfer data from a data store to a plurality of elements of at least one vector register; wherein:
in response to a first type of vector load instruction, when an exceptional condition is detected for the load operation performed for a first active data element of said at least one vector register in a predetermined sequence, the processing circuitry is configured to perform a response action, and when the exceptional condition is detected for the load operation performed for an active data element other than said first active data element in said predetermined sequence, the processing circuitry is configured to suppress said response action and to store element identifying information identifying the active data element for which the exceptional condition is detected; and
in response to a second type of vector load instruction, when said exceptional condition is detected for the load operation for any active data element of said at least one vector register, the processing circuitry is configured to suppress said response action and to store the element identifying information identifying the active data element for which the exceptional condition is detected;
wherein the first type of vector load instruction and the second type of vector load instruction are distinguished by their instruction encoding.

At least some examples provide a data processing method comprising:
in response to a vector load instruction, performing load operations to transfer data from a data store to a plurality of elements of at least one vector register;
when the vector load instruction is of a first type and an exceptional condition is detected for the load operation performed for a first active data element of said at least one vector register in a predetermined sequence, performing a response action;
when the vector load instruction is of the first type and the exceptional condition is detected for the load operation performed for an active data element other than said first active data element in said predetermined sequence, suppressing said response action and storing element identifying information identifying the active data element for which the exceptional condition is detected; and
when the vector load instruction is of a second type and the exceptional condition is detected for the load operation for any active data element of said at least one vector register, suppressing said response action and storing the element identifying information identifying the active data element for which the exceptional condition is detected;
wherein the first type of vector load instruction and the second type of vector load instruction are distinguished by their instruction encoding.

At least some examples provide an apparatus comprising:
means for performing, in response to a vector load instruction, load operations to load data from a data store to a plurality of elements of at least one vector register; wherein:
in response to a first type of vector load instruction, when an exceptional condition is detected for the load operation performed for a first active data element of said at least one vector register in a predetermined sequence, the means for performing is configured to perform a response action, and when the exceptional condition is detected for the load operation performed for an active data element other than said first active data element in said predetermined sequence, the means for performing is configured to suppress said response action and to store element identifying information identifying the active data element for which the exceptional condition is detected; and
in response to a second type of vector load instruction, when said exceptional condition is detected for the load operation for any active data element of said at least one vector register, the means for performing is configured to suppress said response action and to store the element identifying information identifying the active data element for which the exceptional condition is detected;
wherein the first type of vector load instruction and the second type of vector load instruction are distinguished by their instruction encoding.

At least some examples also provide a computer program for controlling a computer to provide a virtual machine execution environment corresponding to the apparatus described above. The computer program may be stored on a computer-readable storage medium, which may be a non-transitory storage medium.

At least some examples provide a computer-implemented method for generating, based on a source program, instructions for processing by processing circuitry, the method comprising:
detecting within the source program a source loop comprising a plurality of iterations, each iteration comprising a first type of vector load instruction for triggering the processing circuitry to perform load operations to load data from a data store to a plurality of data elements of at least one vector register, wherein the first type of vector load instruction has an encoding indicating that when an exceptional condition is detected by the processing circuitry for the load operation performed for a first active data element of said at least one vector register in a predetermined sequence, the processing circuitry is to perform a response action, and when the exceptional condition is detected for the load operation performed for an active data element other than said first active data element in said predetermined sequence, the processing circuitry is to suppress said response action and store element identifying information identifying the active data element for which the exceptional condition is detected; and in response to detecting the source loop, generating instructions for an unrolled loop comprising fewer iterations than the source loop, wherein each iteration of the unrolled loop corresponds to at least two iterations of the source loop and comprises:

a vector load instruction of said first type; and at least one vector load instruction of a second type having an encoding indicating that when the exceptional condition is detected for the load operation for the load operation performed for any active data element of said at least one vector register, the processing circuitry is to suppress said response action and to store the element identifying information identifying the active data element for which the exceptional condition is detected.

At least some examples also provide a data processing apparatus configured to perform the method for generating instructions described above.

A computer program may be provided comprising instructions for controlling a computer to perform the method of generating instructions described above. The computer program may be stored on a computer-readable storage medium, which may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus supporting vector data transfer instructions;

Some specific examples will now be described. It will be appreciated that the invention is not limited to these particular examples.

Figure 1:
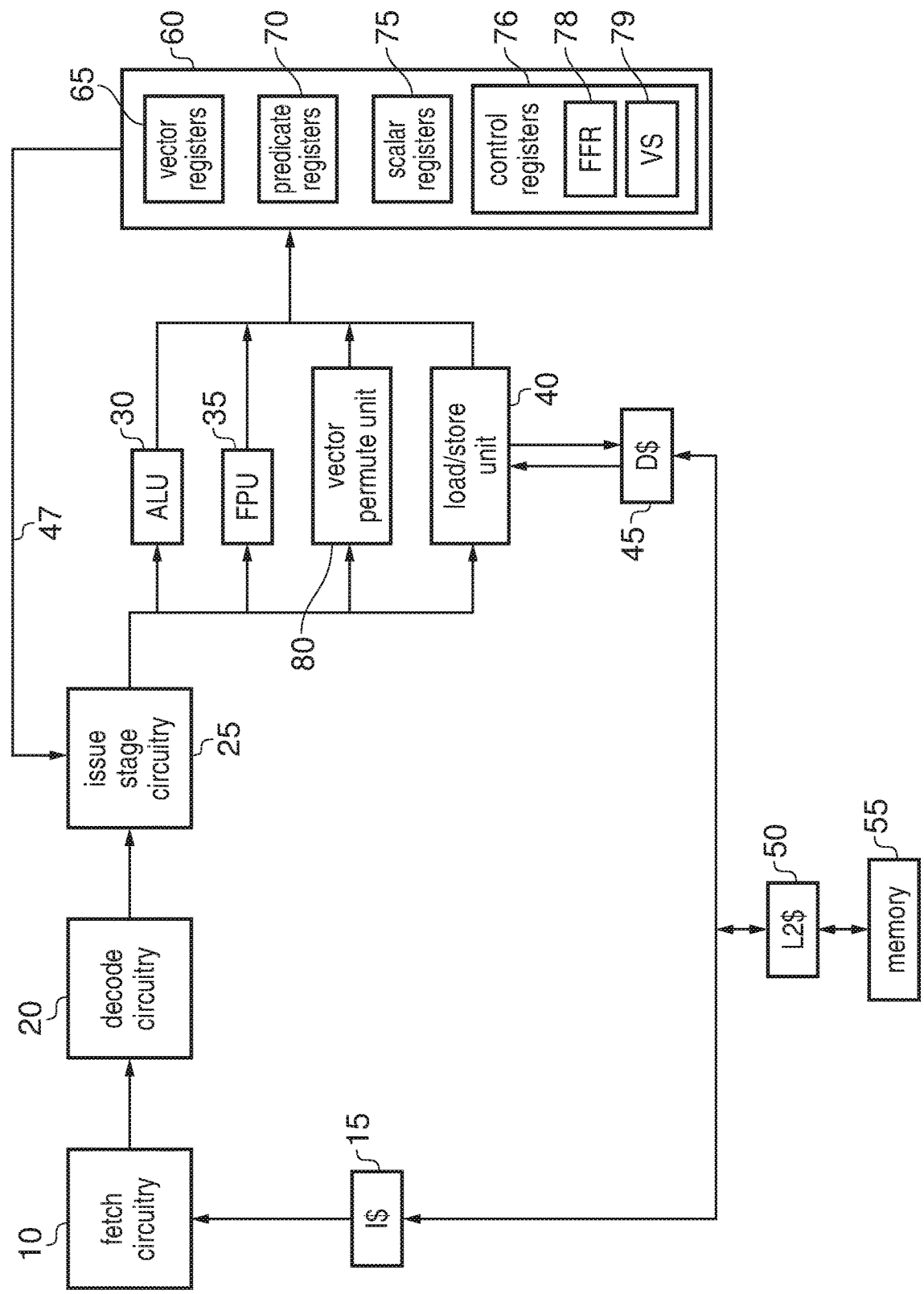

FIG. 1 is a block diagram of a system in which the techniques of the described embodiments may be employed. In the example shown in FIG. 1, the system takes the form of a pipelined processor. Instructions are fetched from an instruction cache 15 (which is typically coupled to memory 55 via one or more further levels of cache such as a level 2 cache 50) by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40, 80 within the pipelined processor. The execution pipelines 30, 35, 40, 80 may collectively be considered to form processing circuitry.

The issue stage circuitry 25 has access to registers 60 in which data values required by the operations can be stored. In particular source operands for vector operations may be stored within the vector registers 65, and source operands for scalar operations may be stored in the scalar registers 75. In addition, one or more predicates (masks) may be stored in predicate registers 70, for use as control information for the data elements of vector operands processed when performing certain vector operations. One or more of the scalar registers may also be used to store data values used to derive such control information for use during performance of certain vector operations (e.g. a vector load/store instruction may specify a scalar register as a base register as discussed below).

The registers 16 may also include a number of control registers 76 for providing various control information, such as configuration information for controlling the operation of the processing pipeline, or status information indicating conditions arising during processing or properties of the outcomes of instructions. For example a control register 76 may include a first faulting register (FFR) 78 and a vector size register (VS) 79, which will be described in more detail below.

The source operands and any associated control information can be routed via a path 47 into the issue stage circuitry 25, so that they can be dispatched to the appropriate execution unit along with the control signals identifying the operation(s) to be performed to implement each decoded instruction. The various execution units 30, 35, 40, 80 shown in FIG. 1 are assumed to be vector processing units for operating on vector operands, but separate execution units (not shown) can be provided if desired to handle any scalar operations supported by the apparatus.

Considering the various vector operations, arithmetic operations may for example be forwarded to the arithmetic logic unit (ALU) 30 along with the required source operands (and any control information such as a predicate), in order to enable an arithmetic or logical operation to be performed on those source operands, with the result value typically being output as a destination operand for storing in a specified register of the vector register bank 65.

In addition to the ALU 30, a floating point unit (FPU) 35 may be provided for performing floating point operations in response to decoded floating point instructions, and a vector permute unit 80 may be provided for performing certain permutation operations on vector operands. In addition, a load/store unit (LSU) 40 is used for performing load operations in order to load data values from the memory 55 (via the data cache 45 and any intervening further levels of cache such as level 2 cache 50) into specified registers within the register sets 60, and for performing store operations in order to store data values from those registers back to the memory 55. It will be appreciated that other types of execution unit not shown in FIG. 1 could also be provided.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) may be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer may typically be provided to keep track of the out of order execution, and to allow the results of the execution of the various instructions to be committed in order.

In the described embodiments, the circuitry of FIG. 1 is arranged to execute vector operations on vector operands stored in the vector registers 65, where a vector operand comprises a plurality of data elements. For certain vector operations performed on such a vector operands (such as arithmetic operations), the required operation may be applied in parallel (or iteratively) to the various data elements within the vector operand. Predicate information (also known as a mask) may be used to identify which data elements within a vector are active data elements for a particular vector operation, and hence are data elements to which the operation should be applied.

Vector processing can be particularly useful when there is a large array of data to be processed and the same set of operations need to be applied to each member of the array. With a purely scalar approach a sequence of instructions would need to load each element of the array from the data cache 45 or memory 55, process that element, and then store the result back to memory, with the sequence being repeated for every element of the array. In contrast with vector processing a single instruction can load multiple elements of the array into a number of data elements of one or more vector registers 65 and then each of those elements in the vector registers can be processed by a common set of instructions before the results are then stored back to the data store. This can allow multiple elements to be processed in response to a single sequence of instructions (preferably allowing at least some elements to be processed in parallel), to improve performance by reducing the number of instructions to be fetched, issued and executed.

Figure 2:
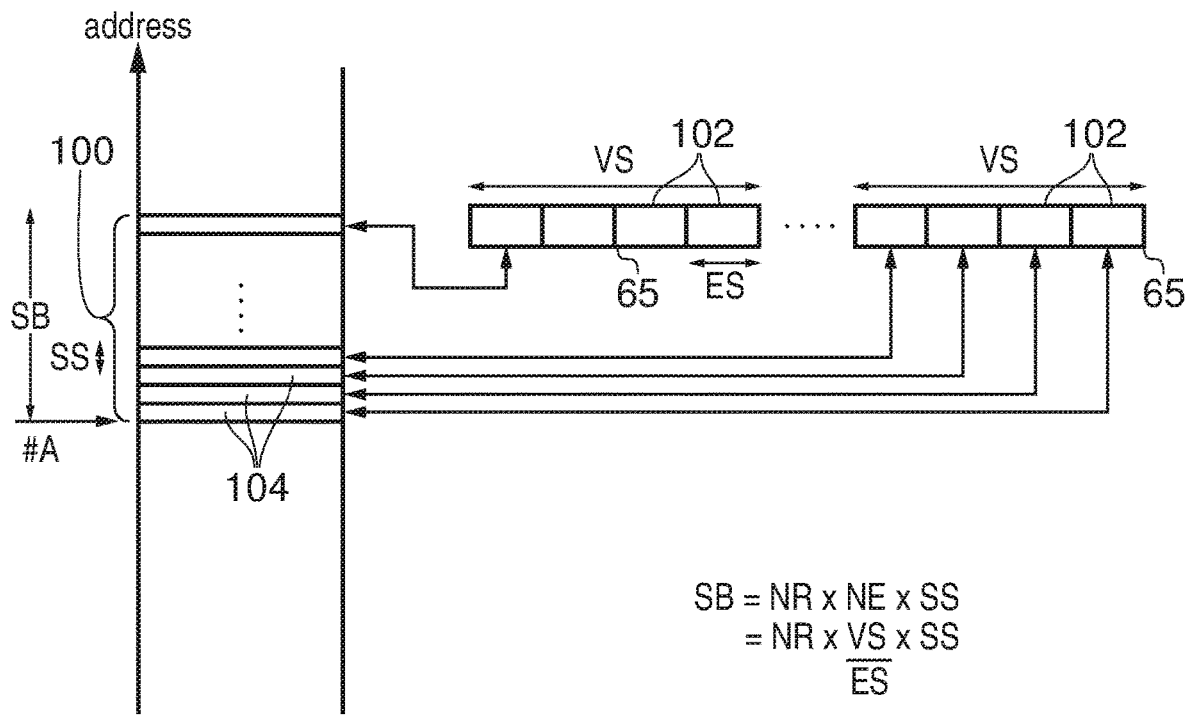
FIG. 2 shows an example of performing data transfer between multiple data elements of at least one vector register and a storage locations of a data store corresponding to a contiguous block of addresses.

Therefore, as shown in FIG. 2, the vector processing system may support vector load or store instructions (collectively referred to herein as vector data transfer instructions) for transferring data between storage locations in a data store corresponding to a contiguous block of addresses 100 and multiple data elements of at least one vector register 65. For a load instruction, each active element 102 of the at least one vector register 65 is loaded with data read from a corresponding portion 104 of the contiguous block of addresses 100. For a store instruction, data from a given active data element 102 is stored to the storage locations corresponding to the corresponding portion 104 of the contiguous block 100.

The block of addresses 100 accessed in response to a given vector data transfer instruction has a certain size SB. The block size SB=NR×NE×SS, where:

NR is number of registers targeted by the instruction,
NE is the number of data elements in each register, and
SS is the size of the unit of addresses represented by one of the sub-portions 104 of the address block corresponding to a single data element 102 of the register 65.

Each of the parameters NR, NE, SS may be either:
  a fixed value hardwired for a given processor (e.g. some processors may only support load/store instructions which target a single vector register),
  a variable value specified (explicitly or implicitly through a dependency on another variable) in one of the control registers 76, or
  a variable value specified (explicitly or implicitly through a dependency on another variable) in the encoding of the vector data transfer instruction. For example either the opcode or another field of the instruction encoding may identify which value is to be used for NR, NE, and/or SS.

Hence, different instruction set architectures may choose different ways of representing these parameters.

For example, as shown in FIG. 1, the vector size register 79 may be provided to identify the vector size VS, corresponding to the total number of bits in one vector register 65, and the instruction encoding may identify a data element size ES to be used for the current operation (i.e. the number of bits or bytes in one data element). Identifying the vector size VS in a variable control register is useful for allowing the same code to be executed across a range of platforms which may be implemented using different vector sizes. The number of data elements per register, NE, may be implicitly identified by the instruction through the specification of the data element size ES, since the processing circuitry can determine NE=VS/ES. In this case, the contiguous address block size SB may also be represented as SB=NR×VS/ES×SS.

Note that SB, VS, ES and SS can be represented in certain units of a given length, e.g. as a number of bits or a number of bytes, or a number of multiples of bits or bytes, or some other unit of data. If SB is represented in bytes as in the examples below, then SS should also be represented in bytes, but VS and ES could be in other units (e.g. bits, bytes) as long as they are the same. In general, SB and SS should be in the same units, and VS and ES should be in the same units, but SB and SS could be in different units to VS and ES.

On the other hand, the number of registers NR may be determined from the instruction encoding. For example, the opcode may specify whether this is a single, double or triple register load/store, say, or the instruction may include a field specifying the number of registers NR.

Figure 3:
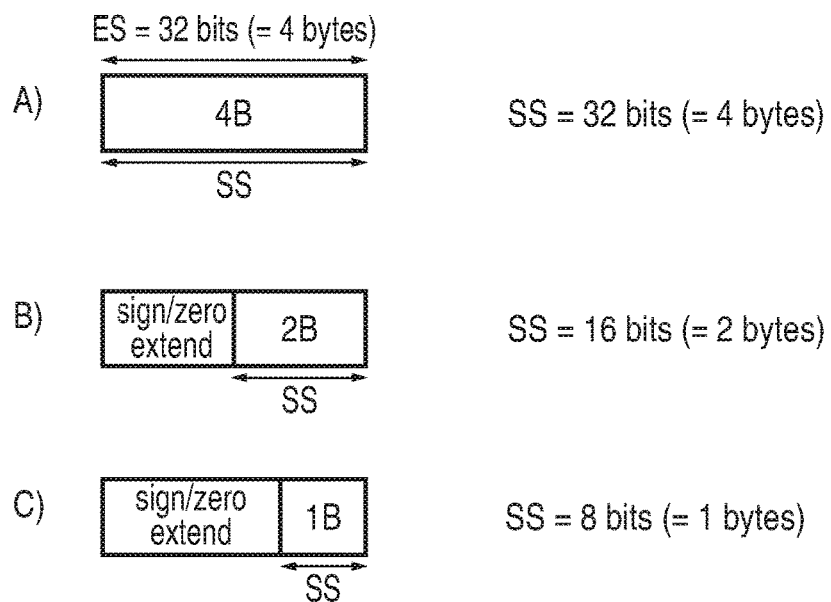
FIG. 3 shows three examples of mapping a data element of a given size to different sized blocks of addresses.

Also, the storage unit size SS may also be identified from the instruction encoding (again, different opcodes could map to different storage unit sizes SS, or there could be a field in the encoding identifying SS). FIG. 3 shows an example of why the storage unit size SS can be different to the data element size ES. As shown in part A) of FIG. 3, some instructions may fill a data element of a given data element size (e.g. ES=32 bits=4 bytes) with a corresponding amount of data from the data store, so that SS=ES=32 bits=4 bytes. However, as shown in parts B) and C) of FIG. 3, some processors may also permit a smaller amount of data from the data store to be transferred to or from a larger data element. For example, parts B) and C) of FIG. 3 show examples where the storage unit size SS is 2 bytes and 1 byte respectively. With such a vector load, the data from a unit of memory of size SS is either sign extended or zero extended to fill one data element of size ES. Similarly, for store instructions a 4-byte value from a data element can be truncated to 2 bytes or 1 byte when storing the data to the data store.

On the other hand, other systems may not support expansion or truncation of data when loading or storing to memory, in which case SS could be a fixed value equal to the data element size ES, and in this case SB simply is equal to NR×VS and it would not be necessary to specify SS in the instruction or a control register.

Note that while the block size SB is equivalent to NR×NE×SS, it does not necessarily need to be determined by multiplying these parameters. As shown above, one or more of these parameters could be fixed or could be determined based on another related parameter, so there may be other ways of generating an equivalent result. Also, if the number of elements NE, the storage unit size SS and any other related parameters such as the vector size VS or data element size ES are generally powers of 2, then rather than multiplying the values an equivalent result could be generated using a shift operation.

Contiguous vector load/store instructions of this type may be used to form a program loop which repeatedly loads a block of data SB from the data store, processes it in some way using a series of vector data processing instructions (e.g. vector add, vector multiply etc.), and then stores the result vector back to memory, before incrementing the start address of the block 100 by an amount corresponding to the block size SB for a subsequent iteration. Hence, often vectorised code may include a loop of the form shown below:

| | | |
|---|---|---|
| loop: | ld1d z0.d, p0/z, [x0] | //load vector with data from block at //address [x0] |
| | //...data processing instructions using loaded vector... | |
| | st1d z6.d, p0/z, [x0] | //store result back to data store at //address [x0] |
| | incb x0, SB | //increment pointer x0 by block size SB |
| | cmp x0, x1 | //determine whether to continue loop |
| | blo loop | // continue if x0 < x1 |

Note that while this simple example shows only a single vector load per iteration, in practice there may be several different vectors to be loaded in each iteration to allow those vectors to be combined in the subsequent data processing.

However, providing such loops incurs a performance cost in executing instructions for controlling the program flow around the loop. In addition to the load/store instructions and the actual data processing instructions, there would also need to be some additional instructions for managing the loop, such as an instruction for incrementing/decrementing a pointer or loop counter (e.g. [x0] above) representing how many times the loop has been executed, an instruction for comparing the pointer or counter with a limit value to determine when to terminate the loop, and a conditional branch instruction for branching back to the start of the loop when the termination condition is not yet satisfied. These instructions would have to be executed on each iteration of the loop, and this slows down performance, especially when the number of loop control instructions is large in comparison with the number of vector instructions for the actual data processing.

To reduce the cost of the loop control, it is possible to perform loop unrolling to replace a given program loop in source code with an unrolled loop which has fewer iterations. Each iteration of the unrolled loop may have more instructions to effectively carry out the processing of multiple iterations of the original source loop. For example, if each iteration of the unrolled loop includes 4 sequences of load, data processing and store instructions for handling data corresponding to 4 different blocks of data in memory, the loop control overhead can be reduced by ¾. An example of such an unrolled loop is shown below:

| | | |
|---|---|---|
| loop: | ld1d z0.d, p0/z, [x0] | //load iter #0 |
| | ld1d z1.d, p0/z, [x0, x1] | //load iter #1 (x1 stores SB) |
| | ld1d z2.d, p0/z, [x0, x2] | //load iter #2 (x2 stores 2*SB) |
| | ld1d z3.d, p0/z, [x0, x3] | //load iter #3 (x3 stores 3*SB) |
| | //4 sets of data processing instructions using each loaded vector z0, z1, z2, z3 | |
| | st1d z6.d, p0/z, [x0] | //store iter #0 |
| | st1d z7.d, p0/z, [x0, x1] | //store iter #1 |
| | st1d z8.d, p0/z, [x0, x2] | //store iter #2 |
| | st1d z9.d, p0/z, [x0, x3] | //store iter #3 |
| | incb x0, 4*SB | //increment pointer x0 by 4*SB |
| | cmp x0, x5 | //determine whether to continue loop |
| | blo loop | // continue if x0 < x5 |

Although an individual iteration of the loop is longer, by executing the control instructions (e.g. incb, cmp, bge) less often the overall performance can be improved. As well as reducing the loop control overhead, loop unrolling can also improve performance by enabling other optimization techniques such as software pipelining or modulo scheduling which may allow better utilisation of processor resources. For example, two or more of the distinct vector instructions within one iteration of the unrolled loop may be able to be processed at least partially in parallel (e.g. by using a larger vector size), while in the original source loop only one instruction would be encountered at the time so that such improvements would not be available. In some cases, the loop unrolling may be performed in software, e.g. by a compiler which compiles source code into executable code to be executed by the processor hardware. However, it is also possible to perform loop unrolling in hardware, e.g. by an earlier stage of the pipeline which may detect loops and replace them with an unrolled loop.

However, contiguous vector data transfer instructions which specify the start address of the transfer using register values only do not support loop unrolling well for several reasons. Contiguous vector data transfer instructions may specify the start address # A of the block 100 of addresses to be accessed using a scalar base register specifying a base address and a scalar index register specifying an index value to be added to the base register to form the start address # A. However, this approach has disadvantages for loop unrolling because it requires additional overhead before the loop is performed to initialise all the index registers used by each respective vector data transfer instruction within the unrolled loop, and also additional instructions may be needed within the loop for incrementing each index register. Also, the use of additional index registers increases pressure on the scalar register file since a greater number of registers will need to be referenced in each iteration of the loop. If there are not enough scalar registers to accommodate all of the values required within one iteration of the loop then this may require the data from some registers to be stored to the memory or cache (e.g. pushed to a stack), and this spilling and filling of registers on the stack is undesirable as it can harm performance.

Figure 4:
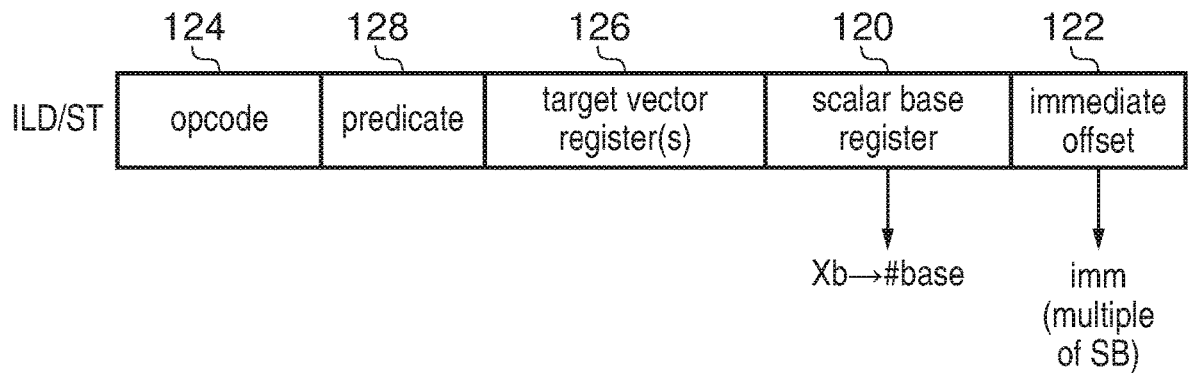
FIG. 4 shows an example of a vector data transfer instruction identifying a start address of a block of addresses to be accessed using a base register and an immediate offset value specified as a multiple of the size of the block of addresses.

Instead, as shown in FIG. 4, a vector data transfer instruction is provided which identifies the start address # A of the contiguous block of addresses 100 using a base register 120 and an immediate offset value 122. An immediate value is a value which is specified directly in the encoding of the instruction rather than with reference to a register. In addition to the base register 120 and the immediate offset 122 the instruction encoding may also include an opcode 124 identifying the type of operation to be performed, an indication of one or more target registers 126, and an indication of a predicate register 128 storing a predicate value for controlling the vector operation.

It may seem surprising that a contiguous vector data transfer instruction specifying a target address using a base register 120 and an immediate offset 122 would be useful. While using an immediate value to specify the offset, rather than an index register, avoids the cost of initialising and incrementing index registers in the unrolled loop and the increased register pressure associated with using more registers, in practice the vector size for vector processors can be very long (e.g. 256 bytes) and the block size SB for each instruction can be relatively large. If 4 or 8 iterations of the original loop are unrolled into a single iteration of the unrolled loop, the required offset for the last data transfer of the loop can be large and may require a significant number of bits to represent this in an immediate offset within the instruction encoding. In practice, many vector instructions set architectures have limited encoding space available, because most bits of the instruction encoding are already required for specifying the opcode, the target registers, the predicate value, the base register and any other parameter which may be required by a given instruction, and so there may simply not be enough room for a large immediate offset. Increasing the number of bits in the instruction encoding may also not be option because this would increase the sizes of buses for transferring instructions within the processing pipeline and increase the amount of memory space required for storing a given program which may be too expensive in terms of power consumption and circuit area. Another issue with using an immediate offset value is that the difference between start addresses for successive data transfer instructions within the unrolled loop may not be known at the time when the unrolled loop is being generated, because as discussed above different hardware implementations may use different vector sizes, or the vector size could be variable within a single implementation, and so it may not be possible for the compiler (or other software or hardware performing the loop unrolling) to know what offset should be specified for a given instruction. For these reasons, specifying the start address for a given instruction using a base register and a simple immediate byte offset would not appear to be a viable option.

However, in the vector data transfer instruction shown in FIG. 4 the immediate offset is specified not as an absolute value, but as a multiple of the block size SB of the contiguous block of addresses to be loaded. The load/store unit 40 may include an address generating unit which generates the start address # A with a value equivalent to a result of adding the base address stored in the scalar base register Xb to the product of the immediate offset value imm and the block size SB. The block size SB can be determined equivalent to NR×NE×SE as discussed above for FIG. 2. The product of the immediate value imm and the block size SB could be determined in different ways. While some implementations could actually multiply the immediate value imm by the block size SB, if the block size SB is a power of 2 then another option is to left shift the immediate value imm by a number of bits corresponding to $\log_2(SB)$. The product can then be added to the base address to generate the start address # A.

Figure 5:
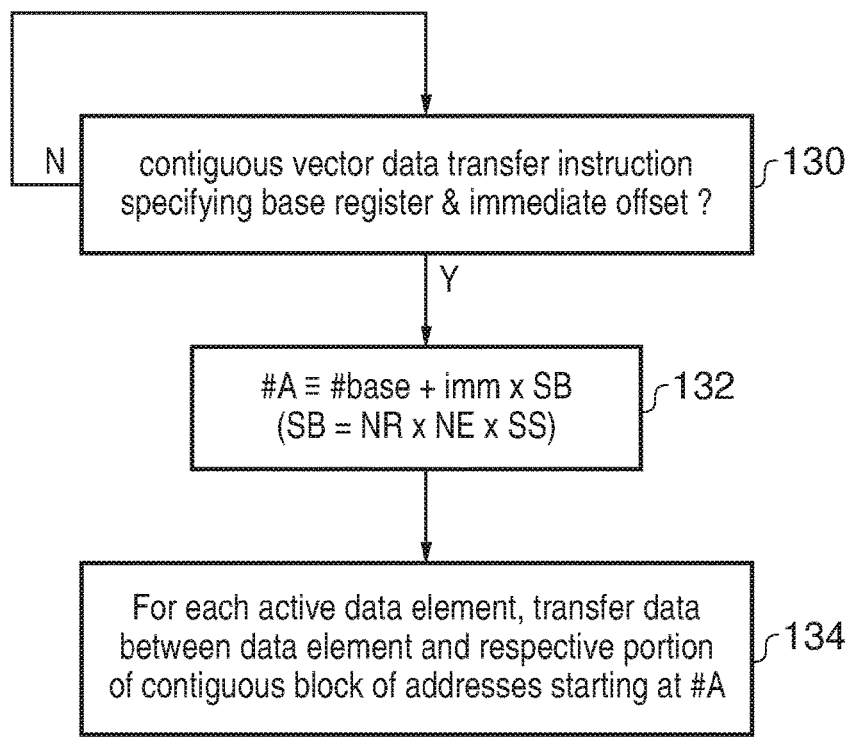
FIG. 5 shows a method of processing the vector data transfer instruction.

FIG. 5 shows a method of processing a contiguous vector data transfer instruction. At step 130 it is determined whether the instruction is a contiguous vector data transfer instruction specifying a base register and an immediate offset. If not, then the instruction is processed in another way. If the instruction is a contiguous vector data transfer instruction specifying a base register and an immediate offset, then at step 132 the load/store unit 40 calculates the start address # A with a value equivalent to the result of adding the base address # base to the product imm×SB. Note that the start address # A can be determined in any way which gives a result equivalent to # base+imm×SB but need not actually be calculated in this way (e.g. the multiplication could be implemented using a shift instead as discussed above). At step 134, the load/store unit triggers a series of data transfers with each data element corresponding to a respective portion of the contiguous block 100 of addresses starting at address # A and data transfers being performed between a given data element and the corresponding portion 104 of the address block 100 when that data element is indicated as an active data element by the predicate in predicate register 128. For example, the least significant element of the target registers could map to the data at address # A, the next element could map to the data at address # A+SS, and so on, with an $n^{th}$ element of the one or more target registers 65 corresponding to an address # A+n*SS This approach addresses the problems discussed above because by specifying the immediate offset as a multiple of a block size SB, it is not necessary to know the vector size VS at the time of writing the program code or compiling the code. This allows the same instructions to be executed by a range of different hardware implementations which have different vector sizes. Also, because in practice a contiguous vector load/store instruction specifying an immediate offset is only useful for loop unrolling, and register pressure will tend to limit the number of iterations of the original source loop which can be unrolled into a single iteration of the unrolled loop, in practice the immediate offset 122 can be made very small. For example, in many systems it can be unusual to unroll more than 8 iterations of the original loop into a single iteration of the unrolled loop and so a 3-bit unsigned immediate value representing positive values in the range value 0 to 7 may be sufficient. This means that even when the instruction set architecture has limited encoding space, a very small immediate offset 122 may still fit within the instruction set encoding.

While FIG. 4 shows the encoding of an instruction using a given pattern of bits of the instruction, in assembler syntax the instruction can be represented as follows LD1H Zd.S, Pg/Z, [Xb, #1]
LD2H {Zd1.H, Zd2.H}, Pg/Z, [Xb, #2]
LD3H {Zd1.H, Zd2.H, Zd3.H}, Pg/Z, [Xb, #3]

where in all of the above examples the immediate is encoded as the 4-bit binary value 0b0001, but it is represented in the syntax as a multiple of the number of registers being loaded from memory. The mnemonics LD1H, LD2H, LD3H refer to the number of registers being loaded (i.e. NR=1, 2 and 3 respectively). Alternatively, the assembler syntax could define the immediately value as #1 for all 3 cases shown above.

An example of using this form of instruction for loop unrolling is shown below:

```
//Unrolled × 4 vector loop using the vector length multiple load
//x0 = array pointer for current loop iteration
//p0-p3 = predicates for unrolled iterations #0 to #3
//z0-z3 = load results for unrolled iterations #0 to #3
loop:   ld1d    z0.d, p0/z, [x0, #0]      // load iter #0
```

```
ld1d    z1.d, p1/z, [x0, #1]    // load iter #1
ld1d    z2.d, p2/z, [x0, #2]    // load iter #2
ld1d    z3.d, p3/z, [x0, #3]    // load iter #3
...     //data processing using the loaded vectors
incb    x0, all, mul #4    //base += 4*SB bytes
b       loop
```

In this example, the first vector load instruction of the unrolled loop has an immediate offset of 0 and successive further loads specify immediate offsets of 1, 2, 3 etc. to indicate that each load will load data from a block of addresses displaced by that number of units of the block size SB respectively.

However, in practice, it is not essential for the first load of the unrolled loop to specify a 0 offset. Software pipelining techniques may make it desirable to increment the loop pointer at a position in the loop other than the start or end of the loop, and so in this case the reference point for the base register could be the address of one of the intermediate load instructions of the unrolled loop. This can make it useful to allow negative offsets to be specified. Therefore, the immediate offset value 122 can be specified as a signed integer value which can be encoded in two's complement form with a given number of bits. For example, 4 bits could encode two's complement values in the range −8 to +7. For example, if the increment for the loop is performed after the first two loads but before the final two loads, the offsets could be defined as follows:

```
loop:   ld1d    z0.d, p0/z, [x0, #0]     // load iter #0
        ld1d    z1.d, p1/z, [x0, #1]     // load iter #1
        incb    x0, all, mul #4    //base += 4*SB bytes
        ld1d    z2.d, p2/z, [x0, #-2]    // load iter #2
        ld1d    z3.d, p3/z, [x0, #-1]    // load iter #3
        ...    //data processing using the loaded vectors
        b      loop
```

Figure 6:
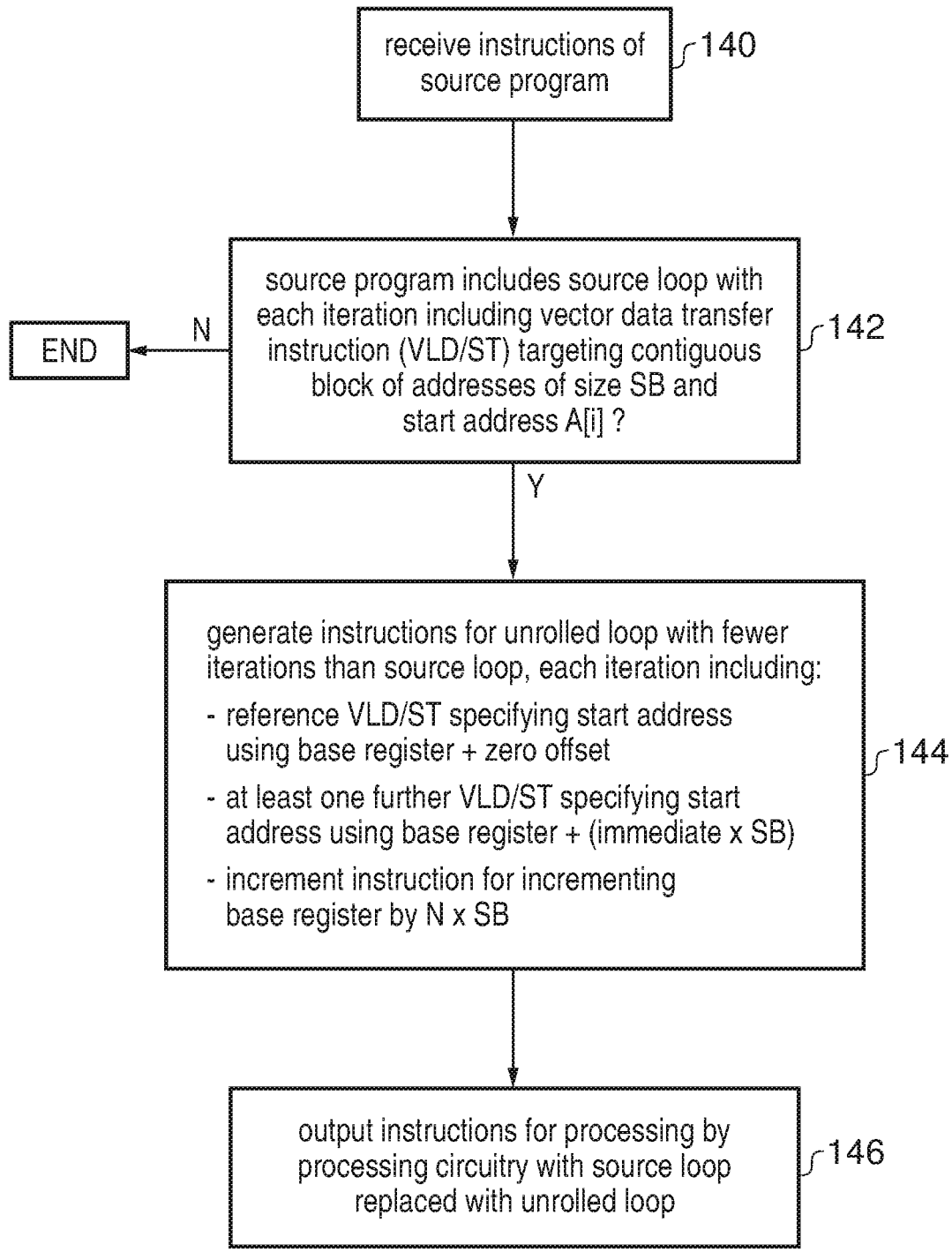
FIG. 6 shows a method for generating instructions to be processed by processing circuitry using the vector data transfer instruction.

FIG. 6 shows a method of performing loop unrolling. This method may be performed by any software or hardware which generates instructions for processing by the processing circuitry in response to a given source program. For example this method could be performed by a compiler which takes a source program and generates compiled code to be executed, or the method could be performed on the fly by circuitry within the same processing pipeline which will actually execute the instructions. In general, the hardware or software performing the loop unrolling is referred to as a loop unroller.

At step 140 the instructions of the source program are received. At step 142 it is detected whether the source program includes a source loop with a number of iterations, where each iteration i includes a vector data transfer instruction targeting a contiguous block of addresses of size SB and having a start address A[i]. If the source program does not include such a loop, then the method ends and the source program is handled in another way. However, if the source program does include such a source loop then at step 144, the loop unroller generates instructions for an unrolled loop with fewer iterations than the source loop, where each iteration of the unrolled loop corresponds to N iterations of the source loop and includes at least a reference vector data transfer instruction specifying a start address using a base register and a zero offset and at least one further vector load or store instruction specifying a start address using a base register and an immediate value specified as a multiple of the block size SB. Each iteration of the unrolled loop may also include an increment instruction for incrementing the base register by an amount corresponding to N×SB. Depending on the timing at which the base register is incremented within the loop, the reference instruction could be earlier, later or part way through the other vector data transfer instructions of the loop. The zero offset for the reference vector data transfer could be specified either using an immediate offset in the same way as discussed above or using a register reference as will be discussed below.

At step 146, the generated instructions are output for processing by the processing circuitry. For example the instructions could be output as a compiled program which can then be stored to memory 55 for processing by the processing circuitry. Alternatively, if the unrolling is being performed on the fly within a pipeline then the output instructions are sent to a subsequent stage for processing.

The particular size of the immediate offset field 122 may depend on the particular instruction set architecture being used. In practice, the number of vector registers 60, scalar registers 75 or predicate registers 70 may place an effective limit on the number of iterations of the source loop which can be unrolled into a single iteration of the unrolled loop, and so it may not be useful to provide an immediate offset field 122 which accommodates any value greater than this limit. For example, if it is expected that each iteration of the source loop would use a maximum of R scalar registers, and the architecture defines M scalar registers, then in practice the maximum number of iterations of the source loop than can be unrolled into a single iteration would be M/R and so the size of the immediate offset field 122 could be selected so that the maximum value representable is M/R−1. An additional bit could also be allocated to accommodate signed values so that both negative and positive offsets can be defined. For example, often R may be 2 or 4 and so providing sufficient bit space for encoding offset values of M/2−1 or M/4−1 can be enough. For example, if M=32 then often unrolling more than 8 iterations may be rare and so a 3-bit unsigned offset field or a 4-bit signed field can be enough to accommodate most practical situations in which the vector data transfer instruction with an immediate offset is likely to be used. On the other hand, if there are fewer predicate registers 70 than scalar registers, then it may be the number of predicate registers that is the limiting factor on the number of iterations of a loop that can in practice be unrolled into a single iteration of an unrolled loop. Hence, in general there may be some constraints which limit the amount of unrolling, and the size of the immediate offset field 122 may be selected based on the constraints arising for a given implementation.

In summary, a vector data transfer instruction identifying a start address of a contiguous block of addresses using a base register and an immediate offset value is, surprisingly, useful even in a system with relatively long vectors or with variable vector lengths. As the immediate offset value is defined as a multiple of the size of the contiguous block of addresses, which may be variably selected depending on the vector length used by the hardware, it is not necessary to know the absolute block size in advance and so the same code can be executed across different platforms using different vector lengths or on a platform supporting variable vector lengths. Since for loop unrolling the number of unrolled iterations is expected to be relatively small the immediate offset value does not require a large field in the instruction encoding and so can be used even in an instruction set architecture with limited encoding space available.

While this form of vector data transfer instruction could be used in an apparatus which uses a fixed size of the contiguous block of addresses, it is particularly useful in an apparatus which provides a variable size of the block of addresses. The apparatus may have a storage element for storing a variable control parameter, which may be read when executing the instruction in order to determine the multiplier to be applied to the immediate offset value to form the offset to the base address. For example the variable control parameter could be a vector size identifying a size of one vector register.

The start address of the contiguous block to be accessed could be determined in a variety of ways which are equivalent to adding the base address to the product of the immediate offset value and a multiplier corresponding to the size of the contiguous block of addresses, but need not actually be determined in this way. The multiplier may have a value equivalent to a product NR×NE×SS, where NR is a number of vector registers for which data is to be transferred in response to the vector data transfer instruction, NE is a number of data elements comprised by each vector register, and SS is a storage unit size of a unit of addresses corresponding to a single data element. Each of NR, NE, SS could be fixed, defined in the instruction encoding or defined in dependence on a variable parameter stored in a control register.

One useful approach is for the vector size VS (the size of one vector register) to be defined in a control register, for the instruction encoding to identify (explicitly or implicitly via the opcode) NR, SS and ES (the size of one data element), and for the multiplier to be determined equivalent to NR×VS/ES×SS. NR, SS, ES are all likely to be known in advance by the programmer/compiler depending on the operations which need to be carried out, while VS depends on the particular hardware implementation. Hence, defining VS in a control register but the other parameters NR, SS, ES using the instruction encoding allows the same code to be executed across a range of hardware implementations using different vector sizes.

It is not necessary to actually perform a multiplication in order to determine the multiplier for multiplying the immediate offset. Often the possible values of NE, SE, ES, VL may correspond to powers of two, and so a left shift by a certain number of bits may be equivalent to a multiplication.

The immediate offset value could be an unsigned integer value, which allows for a smaller immediate field when negative offsets are not required. Alternatively, the immediate offset value could be a signed integer value to permit negative offsets to be used, which is useful because permitting negative offsets gives more flexibility to update the base address at different points of the loop which can be useful for improving performance using software pipelining techniques for example.

The base register referred to by the vector data transfer instruction may be a scalar register (as opposed to scatter-gather type load/store instructions which may specify a vector register to identify different addresses for each element of the target vector to be loaded/stored).

In some cases, when the vector data transfer instruction is a vector load instruction, when an exceptional condition is detected for the load operation performed for a given data element of the vector, a response action for handling the exceptional condition can be suppressed, and instead element identifying information can be stored identifying which data element is the given data element that triggers the exceptional condition. This approach is useful for permitting loop speculation where some elements are processed before an associated condition governing whether those elements should actually be processed has been resolved, which can help to improve performance. This will be discussed in more detail below.

The vector data transfer instruction specifying the immediate offset value may be either a load instruction or a store instruction.

Another issue with processing vectorised code is the handling of exceptional conditions, such as address translation faults or memory permission faults. Often, the array of data to be processed by the vectorised code will not comprise an exact multiple of the block size SB and so a final iteration of the loop may only have some elements processing valid data. In some vectorised loops, each iteration of the loop may have at least one instruction for checking whether one of the loaded data elements meets a stop condition which indicates that the end of the array has been reached, and if this condition is met then the loop may be terminated. If each element had to be separately loaded and tested for the stop condition before loading the next element then the performance benefits of vectorisation would be lost, and so typically the vector load instructions may load a block of data and then test whether any element of the loaded data meets the stop condition. Therefore, some elements may be loaded before it is actually known whether those elements are valid elements which need to be processed. This technique, where at least one element is processed before an associated condition for determining whether that element should be processed has been resolved, may be referred to as loop speculation.

However, if a given iteration of the loop loads data extending beyond the end of the array to be processed, then this may cause faults, because address translation data may not have been defined in the page tables for addresses beyond the end of the array, causing an address translation fault, or the process being executed may not have permission to access the addresses beyond the end of the array, causing a memory permission fault. Hence, exceptional conditions such as address translation faults or memory permission faults may be more likely when loop speculation is used.

If an exceptional condition arises for a given data element, but the end of the array has not yet been reached, then this is a valid exceptional condition and a corresponding response action may need to be taken such as executing an exception handling routine for dealing with a fault. For example the exception handling routine could trigger an operating system to update the page tables to define an address translation mapping for the required address. However, for an element loaded from an address beyond the end of the required array, if an exceptional condition occurs, it would not be desirable to trigger the response action since that address should not have been accessed anyway and a load at that address was only triggered as an artefact of vectorising a code with a given vector length VL or block size SB that steps beyond the end of the array. Therefore, when loop speculation is performed, it may not be desirable to trigger a response action to all exceptional conditions.

Figure 7:
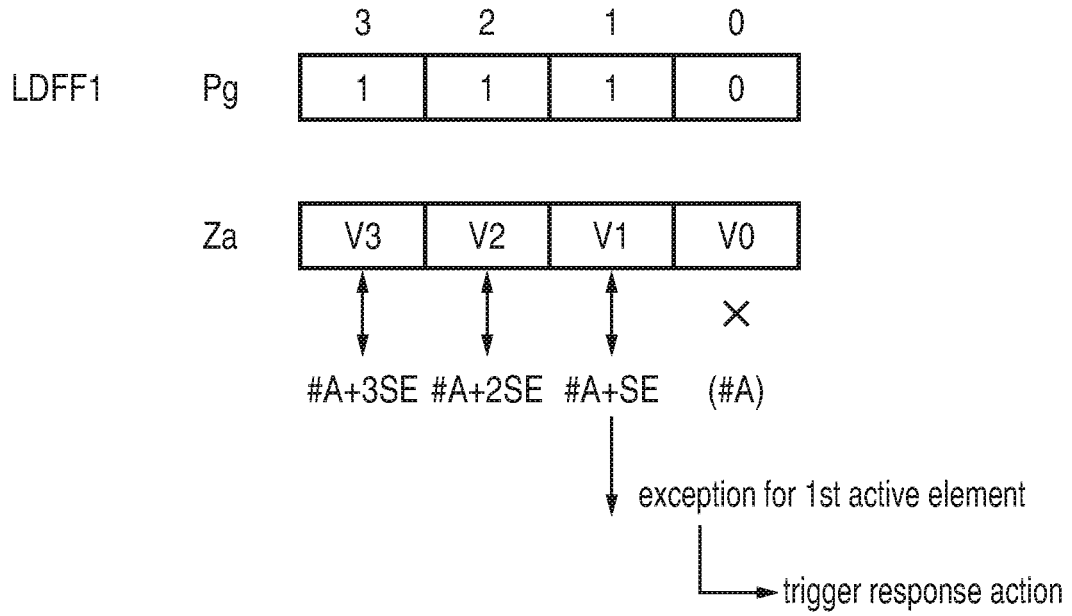
FIGS. 7 and 8 illustrate handling of exceptional conditions for a first type of vector load instruction.
Figure 8:
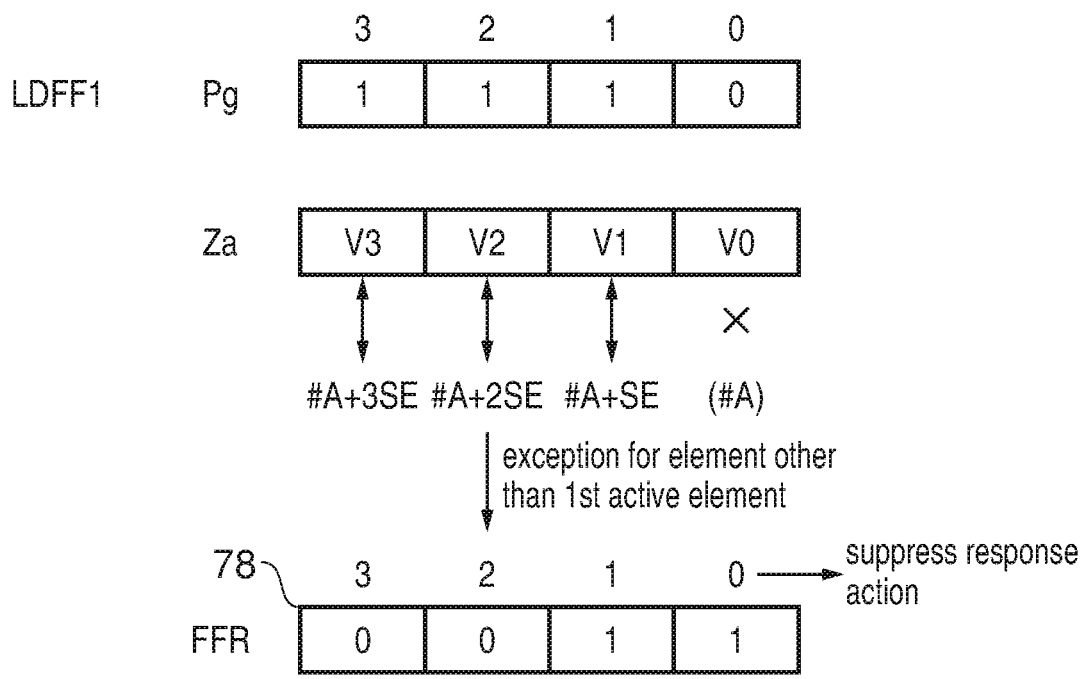

FIGS. 7 and 8 show operation of a first type of vector load instruction for addressing this. The first type of instruction is also referred to as a first-faulting (FF) load instruction because it triggers a response action when an exception condition is detected for the first active element of the vector being loaded, but does not trigger the response action when an exception condition arises for other elements. In this example, the elements are considered in a predetermined sequence going from the least significant element to the most significant element, so the first active element is the least significant element indicated as active by the predicate value Pg. For example, in FIG. 7 element 0 has a predicate bit of 0 and elements 1-3 have predicate bits of 1, and so the first active element is element 1.

In FIG. 7, an exceptional condition occurs for the load operation performed for the first active element (element 1), and so the response action is triggered, such as executing the exception handling routine. Generally the first active element will be loaded non-speculatively because there are no earlier active elements which could lead to the stop condition being satisfied, and so if a fault arises then this is a valid fault and the response action is triggered to deal with this.

On the other hand, as shown in FIG. 8, for the first-faulting vector load instruction if an exceptional condition occurs for an element other than the first active element (e.g. element 2 in this example), then the response action is suppressed. Instead, the processing circuitry updates the first faulting register (FFR) 78 to identify which element caused the fault. If more than one of the subsequent data elements faulted (other than the first active element), then the position of the first of these elements can be identified in the FFR 78, or as discussed below the FFR may identify the first element that faulted and any subsequent elements.

This approach is generally useful for loop speculation because it means that the response action is not triggered immediately when an exceptional condition arises for an element other than the first active element. Having updated the FFR 78, some instructions can then check whether the stop condition is satisfied for an earlier element than the element that faulted, and if so, terminate the loop without handling the exceptional condition, because the exceptional condition only arose because the vector loop extended beyond the end of the data to be processed. On the other hand, if the stop condition has not yet been satisfied, the FFR 78 can be used to identify which element triggered the exceptional condition, and this can be used to trigger a repetition of the looped sequence of instructions with the element that faulted now being the first active element so that if the exceptional condition arises again, the response action can now be triggered because the faulting element will be the first active element. Hence, while the first-faulting approach may delay valid exceptional conditions being handled (since the sequence of instructions may need to be repeated several times to allow each respective element which faults to be treated as the first active element), this overhead is typically outweighed by the performance gains achieved by permitting more elements to be processed per iteration of the loop (leading to less loop control overhead), which is possible because even if a large block of data is loaded per iteration of the loop before the stop condition has been resolved, the first-faulting mechanism prevents spurious response actions being triggered by elements handled speculatively which later turn out not to be needed.

As shown in FIG. 8, the FFR 78 may be defined as an element mask which includes a number of bits each corresponding to one of the elements of the vector being loaded. The bits corresponding to the faulting element and any subsequent element have a first value (0 in this example) and the bits for any earlier elements than the faulting element have a second value (1 in this example). Defining the FFR 78 in this way is useful for enabling a new predicate or address to be determined for a subsequent attempt to execute the sequence of instructions (see FIG. 13 below), so that the faulting element becomes the first faulting element for the subsequent attempt. Hence, the FFR 78 is useful to allow processing of the data elements to resume after the resolution of the fault, without unnecessarily repeating operations already performed for elements which did not trigger a fault.

Hence, a first-faulting instruction of this form is useful for vectorised code to prevent unnecessary traps to an operating system or other software for handling exception conditions introduced as an artefact of vectorisation. However, when performing loop unrolling the first-faulting form of the instruction does not work for instructions other than the first instruction of the unrolled loop. While the first active element of the first load of the unrolled loop is likely to be non-speculative (as there are no earlier active elements which could lead to the stop condition being satisfied), for subsequent loads the first active element may also be a speculatively loaded element. Typically the stop condition of the unrolled loop may be resolved once all of the loads within the unrolled loop have completed, and so any element other than the first active element loaded by the very first load of the unrolled loop could be a speculative element, and so it would be undesirable to trigger response actions on the first active element of every load within the unrolled loop.

Figures 9, 10, 11:
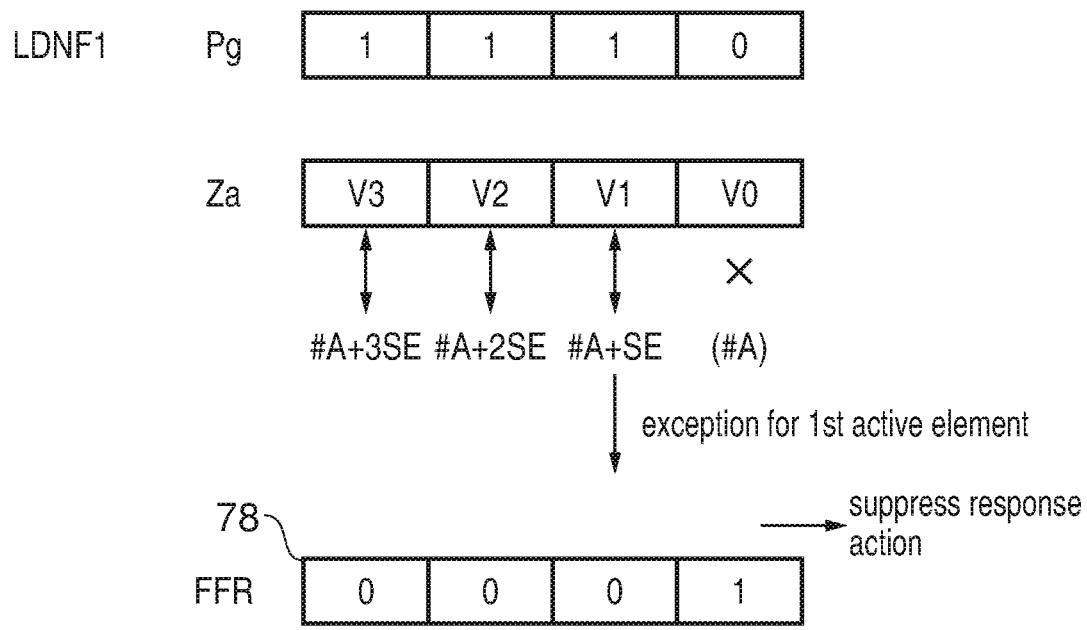
FIG. 9 illustrates handling of exceptional conditions for a second type of vector load instruction.
FIGS. 10 and 11 show two examples of distinguishing the first and second types of vector load instruction.

As shown in FIG. 9, a second type of vector load instruction can be provided, referred to as a non-faulting (NF) vector load instruction. When a non-faulting vector load instruction is executed, then even when an exception condition arises for the first active element, the response action is still suppressed and the FFR 78 is updated in a similar way to FIG. 8 to identify the element which faulted. Hence, for the non-faulting type of load instruction, regardless of which element triggers a fault, no response action is triggered and the first faulting register 78 is updated to identify the element which caused the fault. As shown in the example below, this allows loop unrolling to use the first-faulting form of the instruction (e.g. ldff1d) for the very first load in the unrolled loop and to use the non-faulting form of the instruction (e.g. ldnf1d) for subsequent loads within the unrolled loop:

```
// Unrolled × 3 vector loop using the non-fault load invention
// x0 = array pointer for current loop iteration
// p0-p2 = predicates for unrolled iteration #0 to #2
// z0-z2 = load results for unrolled iterations #0 to #2
loop:   setffr                          // FFR = all true
        ldff1d z0.d, p0/z, [x0, #0]     // first-fault load iter #0
        rdffr p4.b                      // read FFR for first load
        ldnf1d z1.d, p1/z, [x0, #1]     // non-fault load iter #1
        rdffr p5.b                      // read FFR for second load
        ldnf1d z2.d, p2/z, [x0, #2]     // non-fault load iter #1
        rdffr p6.b                      // read FFR for third load
        brkn p5.b, p0/z, p4.b, p5.b     // propagate fault in #0 to #1
        brkn p6.b, p1/z, p5.b, p6.b     // propagate fault in #1 to #2
        ... // operations predicated on p4, p5 and p6
        incb x0, all, mul #3 // base += 3*SB bytes
        b loop
```

The two types of the instruction can be distinguished in any way within the instruction encoding. It is possible to provide two entirely different opcodes for these instructions, or to provide a common opcode with a flag in the instruction encoding specifying whether the instruction is first-faulting or non-faulting. However, this would require additional encoding space within the instruction set architecture, either requiring an additional opcode to be allocated for these instructions, which may prevent another kind of operation being included within the instruction set architecture, or requiring an additional bit of the encoding to represent the flag.

Therefore, a more efficient way of encoding the first and second types of instruction can be to use the way in which the address offset is represented within the instruction to signal the whether the instruction is the first or second type of instruction. As discussed above, a form of instruction specifying an immediate offset 122 representing a multiple of the block size SB may be provided, which is primarily useful for loop unrolling, which is also the situation in which the second type of instruction is likely to be used. Hence, the way the address offset is defined may also determine whether the instruction is first-faulting or non-faulting.

FIG. 10 shows a first example of distinguishing the two types of instructions. In this example, if the immediate offset value is zero then the instruction is the first (first-faulting) type, and if the immediate offset value is non-zero, then the instruction is the second (non-faulting) type. Often, when performing loop unrolling the very first load of the unrolled loop will have an offset of zero, and the subsequent loads will have non-zero offsets, and so whether the immediate offset is zero can be used to identify the type of faulting behaviour. This enables the two forms of instruction to trigger different exception handling behaviours without requiring any additional bit space within the encoding.

FIG. 11 shows a second example of distinguishing the instructions. In addition to the vector load instruction of the type shown in FIG. 4 which specifies an immediate offset, the instruction set architecture may also include a corresponding vector load instruction which specifies the offset using an index register. In this case, when a vector load instruction specifies the offset using an index register, then this may be treated as the first-faulting type of instruction, and when the offset is specified by an immediate value, then this may be treated as the non-faulting type of load instruction. Since both the use of an immediate offset value and the non-faulting type of load instruction are likely to be used mainly for loop unrolling, most instances of using the non-faulting type of load instruction will also specify an immediate offset value, and so making the immediate-specifying load instruction be non-faulting by default avoids needing to use up any other bit space within the instruction encoding.

When the approach shown in FIG. 11 is used, the very first load of an unrolled loop can have its offset specified using an index register, so that it triggers a first faulting behaviour. In some cases a general purpose register can be allocated for storing the index for the first load, and while this would require one additional scalar register per unrolled loop iteration, since the subsequent loads can specify the offset using an immediate value it still incurs less register pressure than if every load had a separate index register. In any case, often the first load of the unrolled loop will use a zero offset, and some architectures define a predetermined register which is assumed by default to equal zero (in addition to the general purpose registers which can be set to any value). Either a hardwired register storing zero could be provided in hardware, or the predetermined register may not correspond to an actual register, but the processing circuitry may simply map the register specifier of the predetermined register to an input value of zero without needing to access the register bank. Therefore, by referring to the predetermined register for the first load of the unrolled loop, there is no need to use up a general purpose scalar register even when the first load specifies the offset using an index register.

Hence, the example of the unrolled loop shown above can be modified based on the approach shown in FIG. 11 so that the first-faulting instruction ldffld identifies its offset by reference to the predetermined register xzr, and by default will be treated as first-faulting because it uses an index register to identify its offset, in contrast to the non-faulting instructions ldnfld which refer to an immediate value #1, #2 etc.:

```
// Unrolled x 3 vector loop using the non-fault load invention
// x0 = array pointer for current loop iteration
// p0-p2 = predicates for unrolled iteration #0 to #2
// z0-z2 = load results for unrolled iterations #0 to #2
loop:   setffr                          // FFR = all true
        ldffld z0.d, p0/z, [x0, xzr]    // first-fault load iter #0
        rdffr p4.b                      // read FFR for first load
        ldnfld z1.d, p1/z, [x0, #1]     // non-fault load iter #1
        rdffr p5.b                      // read FFR for second load
        ldnfld z2.d, p2/z, [x0, #2]     // non-fault load iter #1
        rdffr p6.b                      // read FFR for third load
        brkn p5.b, p0/z, p4.b, p5.b     // propagate fault in #0 to #1
        brkn p6.b, p1/z, p5.b, p6.b     // propagate fault in #1 to #2
        . . . // operations predicated on p4, p5 and p6
        incb x0, all, mul #3 // base += 3*SB bytes
        b loop
```

Figure 12:
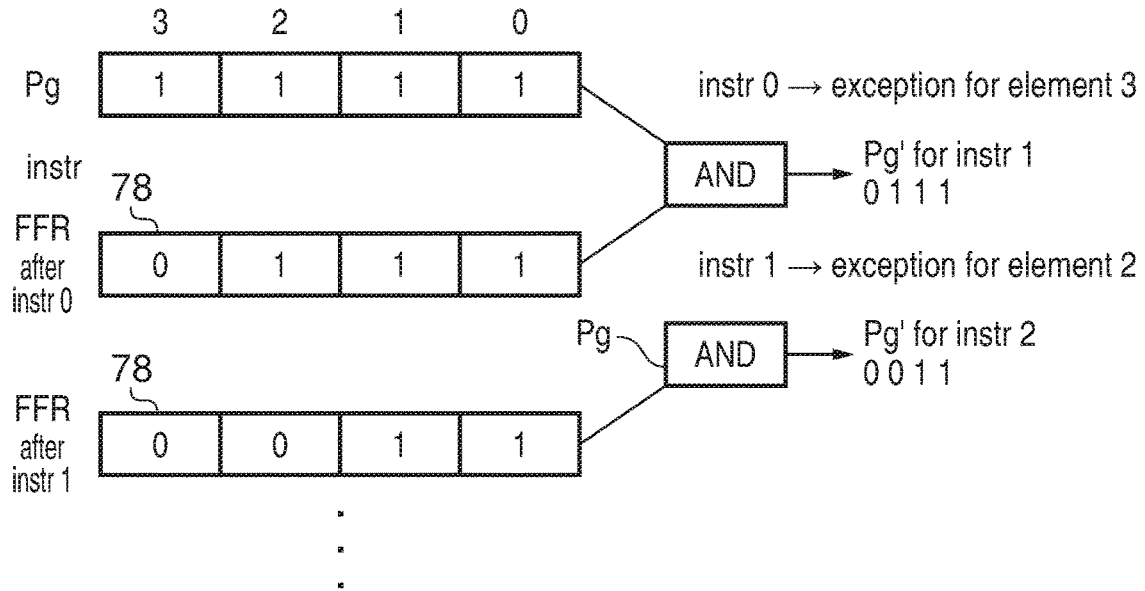
FIG. 12 shows use of a fault register for recording cumulative fault information identifying which data element triggered an exceptional condition for a sequence of instructions.

FIG. 12 shows schematically an example of using the FFR 78 to track exceptional conditions arising from a sequence of instructions which act on a given set of data elements, with each instruction of the sequence using the result from the previous instruction. If a given element for any of these instructions triggers a fault then it may not be desirable to carry on with the processing of that element and any subsequent elements in the subsequent instructions of the sequence. Therefore, the first faulting register can be defined a cumulative manner, so that before the start of the sequence, it is set with all bits equal to 1, and then if any instruction triggers a fault on a given element (other than the first active element for a first-faulting instruction), then the bits corresponding to the given element and any subsequent elements are cleared in the first faulting register 78, and will remain clear for the rest of that sequence of instructions. By combining the first faulting registers 78 with the predicate value Pg using an AND operation, a modified predicate Pg' can then be generated for any subsequent instructions to prevent the element which faulted being processed further. If a subsequent instruction (e.g. instruction 1 in FIG. 12) then generates another fault on an earlier element then at least one further bit of the FFR 78 can be cleared to 0, so that the next instruction will process even fewer elements.

Figure 13:
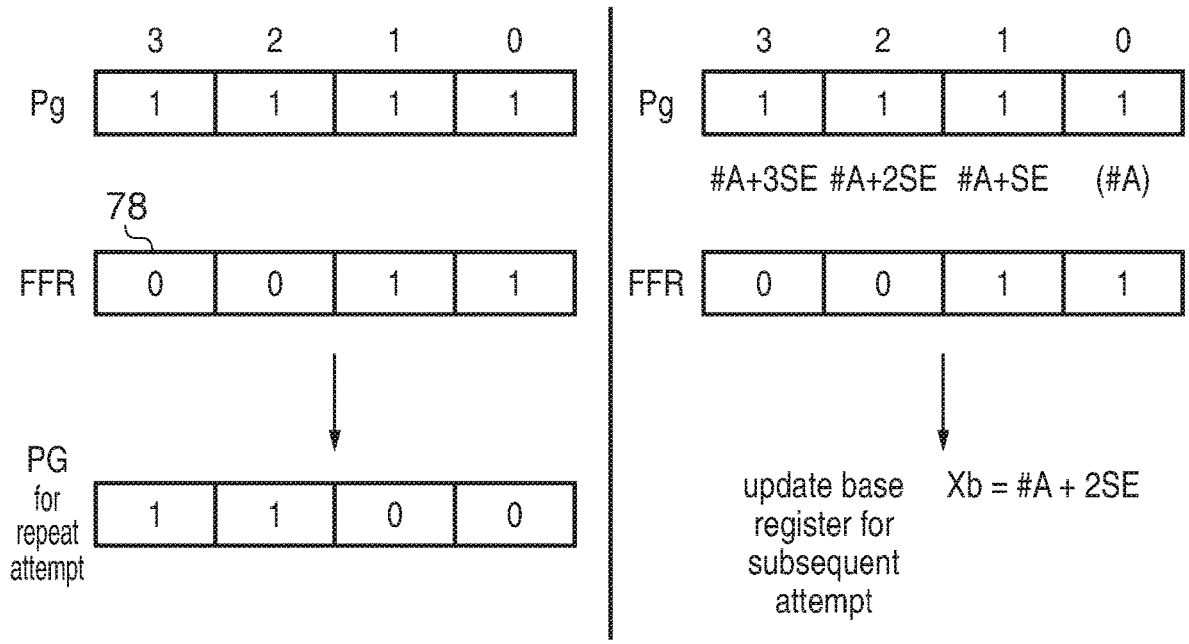
FIG. 13 shows two different techniques for using the fault information to control a repeated attempt to execute a vector load instruction for which a fault was detected.

Alternatively, rather than ANDing the previous mask Pg with the FFR as shown in FIG. 13, instead an instruction (e.g. rdffr instruction shown in the example above) could simply read the FFR and store the result to a corresponding register p4/p5/p6 which is used as the predicate register by subsequent instructions of the sequence.

The brkn instructions in the examples above are of the format:

BRKN Pdm.B, Pg, Pn.B, Pdm.B, which controls the processing circuitry to perform the following operation:

if the predicate bit in Pn which corresponds to the last (i.e. leftmost, most significant) true/active/non-zero bit in Pg is also true/active/non-zero then Pdm is left unchanged, and if the predicate bit in Pn which corresponds to the last (i.e. leftmost, most significant) true/active/non-zero bit in Pg is false/inactive/zero then Pdm is cleared to all false/inactive/zero.

In other words:

Pdm=LastActive(Pg, Pn) ? Pdm: 0;
(// LastActive( ) finds the leftmost set bit in Pg and returns whether the same bit in Pn is true).

In other words, the brkn instructions ensure that if the first load detected a failure, meaning that the last active element in FFR is false after that load, then that failure gets propagated to the FFR result of the second load by setting it to all zero, and so on. The brkn instructions propagate the "break" condition to the next sub-iteration of the unrolled loop.

Once the end of the sequence has been reached, any successfully completed elements are treated as a valid result, and the loop may include some instructions for examining the FFR 78 and resolving the stop condition to determine whether faults generated for the faulting elements are spurious faults generated due to loop speculation (and so the faults do not need to be handled and the loop can end), or are valid faults which need to be handled by repeating the sequence. As shown in FIG. 13, the FFR 78 can be used to determine a new predicate (mask) or a new address for the repeated attempt to execute sequence. The left hand side of FIG. 13 shows generating a new predicate with the first element that faulted (first element with a '0' bit in the FFR 78) now becoming the first active element (first element with a '1' bit in the updated mask). Alternatively, as shown in the right hand side of FIG. 13, it is also possible to use the FFR 78 to update the base address of the load instruction so that the base address for the subsequent attempt now corresponds to the address which was loaded by the faulting element. Either way, when the sequence is repeated, the element which faulted is now the first active element and so the first-faulting type of instruction at the start of the looped sequence will trigger a response action if the fault happens again for that element.

Figure 14:
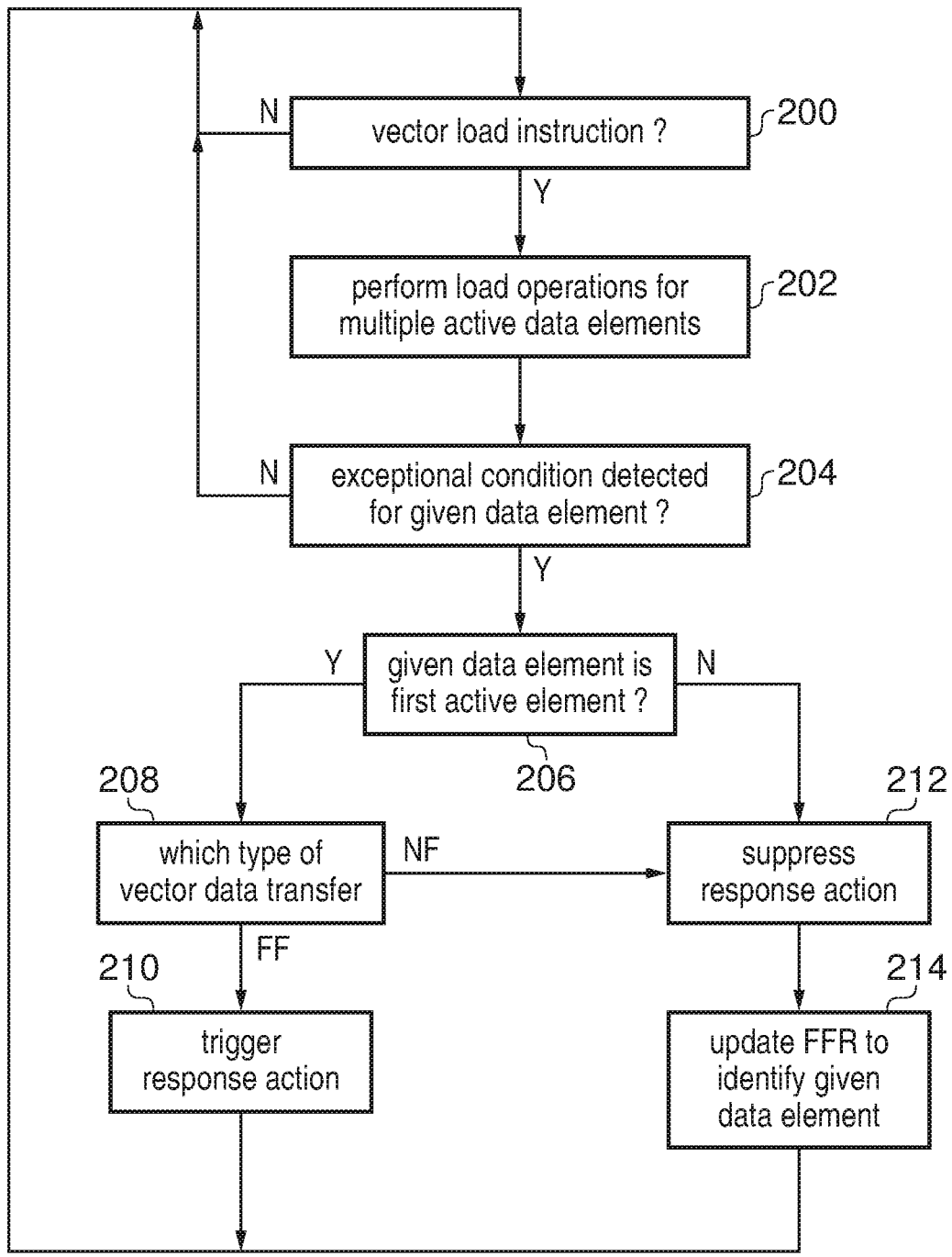
FIG. 14 shows a method of handling exceptional conditions for a vector load instruction.

FIG. 14 shows a method of processing vector load instructions which may encounter exceptional conditions. At step 200 the processor determines whether the current instruction is a vector load instruction and if not then the instruction is processed in some other way. When a vector load instruction is encountered then at step 202 load operations are performed for multiple data elements of a vector. The addresses for each element may be calculated based on a start address calculated using a base register and an offset, or using a base register and index register. At step 204 it is determined whether an exceptional condition is detected for any given data element of a vector. If not then the method returns to step 200 to process the next instruction and the load operations will be carried out successfully.

However if an exceptional condition is detected, then at step 206 it is determined whether the given data element which triggered the fault is the first active data element of the vector. If multiple elements have triggered a fault then it is determined whether the first of these elements is the first active element. If the given data element that faulted is the first active data element, then at step 208 it is determined whether the current vector load instruction is of the first-faulting type or the non-faulting type. If the vector load instruction was the first-faulting type of instruction, then at step 210 the response action is triggered, such as executing an exception handling routine or recording some information indicating that the fault has occurred. On the other hand, if the instruction is a non-faulting form of instruction then at step 212 the response action is suppressed (i.e. not performed) and at step 214 the first faulting register 78 is updated to identify the given data element that faulted. If at step 206 the given data element is not the first active element then the method proceeds to step 212 directly from step 206 (the response action is suppressed and the FFR 78 updated regardless of whether the instruction is first-faulting or non-faulting).

The technique shown in FIG. 14 can be used for all types of vector load instructions, not only the contiguous loads of the type discussed above. Hence first and second types of load instruction with different faulting behaviour could also be defined for gather-load instructions which specify an address vector defining a number of discrete addresses for each element of a target vector, with the load gathering data from each discrete address into the target vector.

Figure 15:
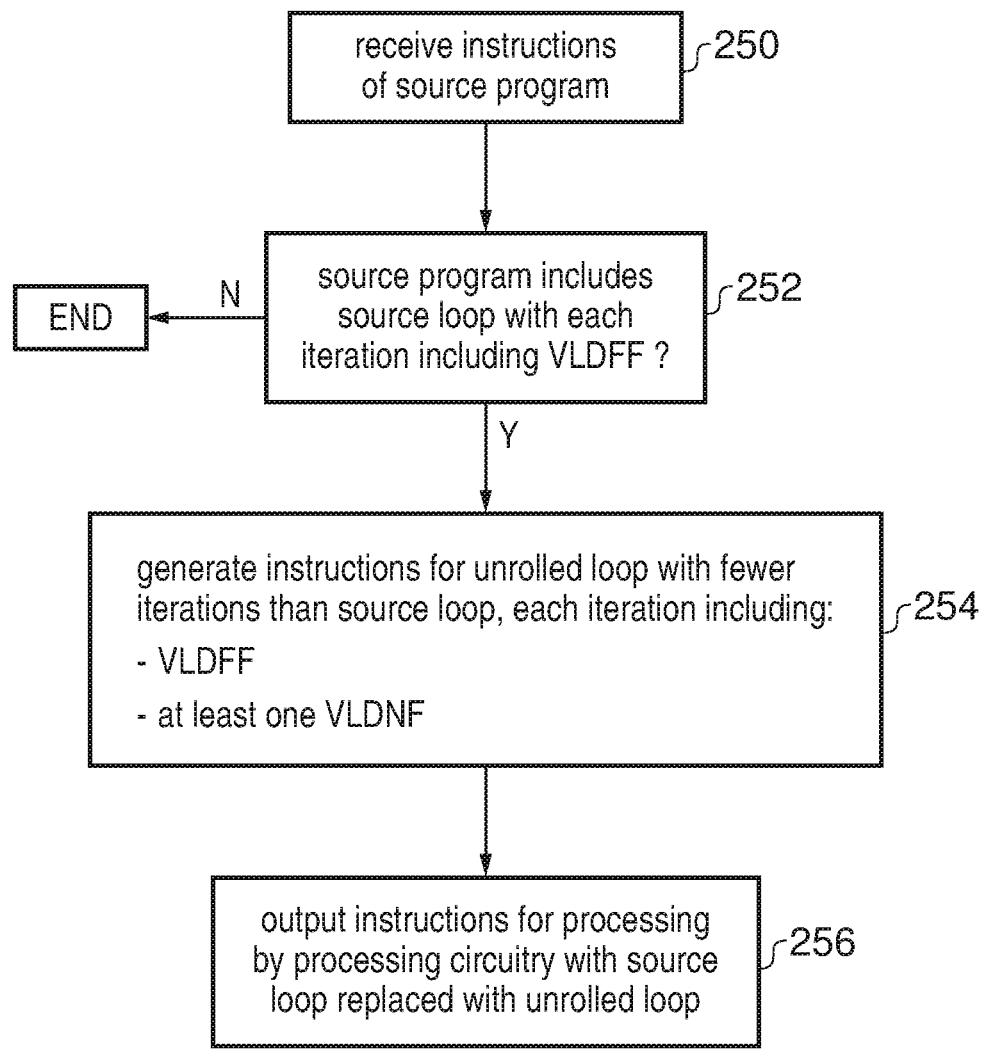
FIG. 15 illustrates a method of generating instructions for processing by processing circuitry using the first and second types of load instruction.

FIG. 15 shows a method of generating instructions for processing by a processing circuitry, which can be performed by a loop unroller, which may be implemented in software (e.g. a compiler) or by hardware (e.g. circuitry within the same pipeline which will execute the generated instructions). At step 250 instructions of the source program are received. At step 252 the loop unroller determines whether the source program includes a source loop with each iteration including a first-faulting vector load instruction, and if there is no such loop then the method ends and instructions are generated in some other way. However if the source program does include a source loop then at step 254 the loop unroller generates instructions for an unrolled loop with fewer iterations than the source loop. Each iteration of the unrolled loop includes a first-faulting vector load instruction and at least one non-faulting vector load instruction. At step 256 the loop unroller then outputs the instructions for processing by the processing circuitry with the source loop replaced with the unrolled loop.

It will be appreciated that some loop unrolling methods may combine the techniques of FIGS. 6 and 15, to use both the first/second types of instruction shown in FIG. 15 and the option where at least the instructions of the second type specify the offset using the immediate value. Other loop unrolling methods may use only one or other of the techniques shown in FIGS. 6 and 15.

Figure 16:
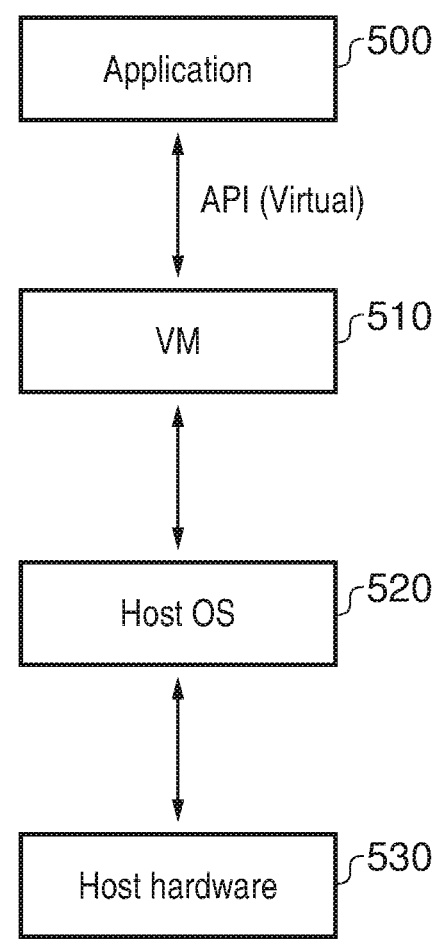
FIG. 16 illustrates a virtual machine implementation.

FIG. 16 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

In summary, first and second types of vector load instructions can be defined in an instruction set architecture. For the first type of instruction, a response action is triggered when an exceptional condition is detected for the load operation performed for a first active data element of the target vector register in a predetermined sequence, but the response action is suppressed if the exceptional condition occurs for the load operation performed for an active data element other than the first active element, and in that case element identifying information is stored identifying the active data element for which the exceptional condition is detected. For the second type of instruction, the response action is suppressed and the element identifying information stored when the exceptional condition is detected for the load operation performed for any active element of the target vector register.

This approach helps to improve performance because it permits two techniques for improving performance of vectorised code to be used together, namely loop unrolling (where multiple iterations of a loop are combined into a single iteration of an unrolled loop) and loop speculation (where the load operation for at least one active data element can be performed before an associated condition for determining whether that load operation should actually be performed has been resolved). In contrast, with previous forms of instruction it would be difficult to use both loop unrolling and loop speculation. By providing the second type of vector load instruction in addition to the first, in unrolled loops the second type of instruction can be used to prevent spurious exception handling response actions being triggered by elements processed by instructions other than the first load instruction of the unrolled loop, when those elements are being handled speculatively before the loop halt condition has been resolved.

In general the vector load instruction may have a mask (or predicate) indicating which elements are active or inactive. Following execution of the first or second type of instruction, at least one further instruction may be executed to generate, based on the element identifying information, at least one of a new mask and a new address for a subsequent attempt to execute a vector load instruction of the first type. If a new mask is generated, it may be generated with the given data element that triggered the exceptional condition now being the first active element, while if a new address is generated, the new address may set corresponding to the address previously loaded by the given data element that triggered the exceptional condition. When a vector load instruction of the first type is then repeated using the new mask or address, as the faulting element is now the first active element, then if the fault still occurs then the response action can be triggered to resolve the exceptional condition.

The element identifying information could be set in various ways. For example, the element identifying information could simply be an identifier of the given data element that caused the exceptional condition.

However, a useful approach is to set an element identifying mask with a number of indications corresponding to each element of the at least one vector register for which data is being transferred. Indications corresponding to the element for which the exceptional condition is detected and any subsequent element in the predetermined sequence may be set to a first value (e.g. 0) and indications corresponding to earlier elements in the sequence (if any) may be set to a second value (e.g. 1). Defining the element identifying mask in this way is useful because it makes combining the element identifying mask with the predicate (mask) governing which elements are active simpler.

In general, which element is considered the first active element may be determined according to any arbitrary sequence of elements. For example, the predetermined sequence could extend from least significant element to most significant element of the vector, or vice versa. However, often in practice vectors tend to be populated with the data from the lowest address placed in the least significant element and the data from the highest address placed in the most significant element, and most programmers/compilers tend to write loops iterating through from the lowest address to the highest address. Therefore, when the predetermined sequence extends from the least significant element to the most significant element, this will be often map best to the way in which vectorised code is written. Therefore, in some examples the first active element could be the least significant active data element of the register.

First and second types of vector load instruction as described above can be used both for contiguous vector loads (where the addresses corresponding to each data element to be loaded are contiguous) and for non-contiguous (gather) forms of vector load (where the addresses for each data element are non-contiguous and specified by an address vector).

However, for the contiguous type of vector load it can be useful for at least the second type of vector load instructions to specify the start address of the contiguous block of addresses to be loaded using a base register and an immediate offset value expressed as a multiple of the size of a contiguous block of addresses to be loaded. The first type of vector load instruction could also be defined in this way and if so then these may be distinguished by either their opcode, or by whether the immediate offset value is zero for the first type or non-zero for the second type.

In other examples, the second type of vector load instruction may specify its offset as an immediate value, but the first type may specify an offset (index) register which stores an offset value to be added to the base address to form the start address of the contiguous block of addresses to be accessed. Hence, the addressing mode of instruction may be used to distinguish the type of faulting behaviour. This approach is particularly useful in a system which provides a predetermined zero register specifier which corresponds by default to a value of zero, as this allows the first type of instruction to define a zero offset with an index register reference without needing to waste a general purpose register for storing the zero offset.

The exceptional condition detected for the data elements may be any condition which signals some kind of abnormal result or some error. However, the first/second forms of instruction may be particularly useful when the exceptional condition comprises an address translation fault or memory permission fault. The response action could vary, and may comprise triggering execution of an exception handling routine, and/or setting status information to indicate that the exceptional condition occurred.

Further example arrangements are defined in the clauses below:

(1) An apparatus comprising:

a plurality of vector registers to store vector operands comprising a plurality of data elements; and processing circuitry configured to transfer, in response to a vector data transfer instruction specifying a base register and an immediate offset value, data between the plurality of data elements of at least one vector register and storage locations of a data store corresponding to a contiguous block of addresses;

wherein in response to the vector data transfer instruction, the processing circuitry is configured to determine a start address of said contiguous block of addresses with a value equivalent to a result of adding a base address stored in the base register to a product of the immediate offset value and a multiplier corresponding to a size of said contiguous block of addresses.

(2) The apparatus according to clause (1), comprising a storage element to store a variable control parameter, wherein the processing circuitry is configured to determine the size of said contiguous block of addresses in dependence on the variable control parameter.

(3) The apparatus according to clause (2), wherein the variable control parameter specifies a vector size VS identifying a size of one vector register.

(4) The apparatus according to any preceding clause, wherein the processing circuitry is configured to determine the multiplier with a value equivalent to a product NR×NE× SS, where:

NR is a number of vector registers of said at least one vector register for which data is to be transferred in response to the vector data transfer instruction, NE is a number of data elements comprised by each of said at least one vector register, and SS is a storage unit size of a unit of addresses corresponding to a single data element.

(5) The apparatus according to clause (4), comprising a storage element to store a vector size VS identifying a size of one vector register;

wherein the processing circuitry is configured to determine the multiplier with a value equivalent to NR×VS/ES× SS;

where ES is a data element size of one data element; and the processing circuitry is configured to determine ES, NR and SS based on an encoding of the vector data transfer instruction.

(6) The apparatus according to any preceding clause, wherein the immediate offset value comprises an unsigned integer value.

(7) The apparatus according to any of clauses (1) to (5), wherein the immediate offset value comprises a signed integer value.

(8) The apparatus according to any preceding clause, wherein the base register comprises a scalar register.

(9) The apparatus according to any preceding clause, wherein in response to the vector data transfer instruction, for each data element of said at least one vector register the processing circuitry is configured to perform a data transfer operation for transferring data between that data element and storage locations corresponding to a respective portion of the contiguous block of addresses.

(10) The apparatus according to clause (9), wherein when the vector data transfer instruction is a vector load instruction and at least one exceptional condition is detected for the data transfer operation for a given data element of said at least one vector register, the processing circuitry is configured to suppress at least one response action for handling said at least one exceptional condition and to store element identifying information identifying which data element of said at least one vector register is said given data element.

(11) The apparatus according to any preceding clause, wherein when the vector data transfer instruction comprises a vector load instruction, the processing circuitry is configured to load data from said storage locations of the data store corresponding to the contiguous block of addresses to the plurality of data elements of the at least one vector register.

(12) The apparatus according to any preceding clause, wherein when the vector data transfer instruction comprises a vector store instruction, the processing circuitry is configured to store data from the plurality of data elements of the at least one vector register to said storage locations of the data store corresponding to the contiguous block of addresses.

(13) A data processing method comprising:

receiving a vector data transfer instruction specifying a base register and an immediate offset value; and in response to the vector data transfer instruction:

determining a start address of a contiguous block of addresses, the start address having a value equivalent to a result of adding a base address stored in the base register to a product of the immediate offset value and a multiplier corresponding to a size of said contiguous block of addresses; and transferring data between a plurality of data elements of at least one vector register and storage locations of a data store corresponding to the contiguous block of addresses.

(14) An apparatus comprising:

a plurality of means for storing vector operands comprising a plurality of data elements; and means for transferring, in response to a vector data transfer instruction specifying a base register and an immediate offset value, data between a plurality of data elements of at least one means for storing vector operands and storage locations of a data store corresponding to a contiguous block of addresses;

wherein in response to the vector data transfer instruction, the means for transferring is configured to determine a start address of said contiguous block of addresses with a value equivalent to a result of adding a base address stored in the base register to a product of the immediate offset value and a multiplier corresponding to a size of said contiguous block of addresses.

(15) A computer program for controlling a computer to provide a virtual machine execution environment corresponding to the apparatus according to any of clauses (1) to (12).

(16) A computer-implemented method for generating, based on a source program, instructions for processing by processing circuitry, the method comprising:

detecting within the source program a source loop comprising a plurality of iterations, each iteration of the source loop comprising a vector data transfer instruction for transferring data between a plurality of data elements of at least one vector register and storage locations in a data store corresponding to a contiguous block of addresses having a start address identified by the vector data transfer instruction and a given block size, where the contiguous block of addresses for a given iteration of the source loop is contiguous with the contiguous block of addresses for a following iteration; and in response to detecting the source loop, generating instructions for an unrolled loop comprising fewer iterations than the source loop, wherein each iteration of the unrolled loop corresponds to at least two iterations of the source loop and comprises:

a reference vector data transfer instruction specifying a base register for storing the start address identified by the vector data transfer instruction of a selected iteration of said at least two iterations of the source loop; and at least one further vector data access instruction specifying said base register and an immediate offset value specifying, as a multiple of the given block size, a difference between the start address stored in the base register and the start address identified by the vector data transfer instruction of a remaining iteration of said at least two iterations of the source loop.

(17) A data processing apparatus configured to perform the method of clause (16).

(18) The data processing apparatus according to clause (17), wherein the data processing apparatus comprises said processing circuitry configured to execute the instructions generated according to said method.

(19) A computer program comprising instructions for controlling a computer to perform the method of clause (16).

(20) A storage medium storing the computer program of clause (19).

(21) A computer-implemented method for generating, based on a source program, instructions for processing by processing circuitry, the method comprising:

detecting within the source program a source loop comprising a plurality of iterations, each iteration comprising a first type of vector load instruction for triggering the processing circuitry to perform load operations to load data from a data store to a plurality of data elements of at least one vector register, wherein the first type of vector load instruction has an encoding indicating that when an exceptional condition is detected by the processing circuitry for the load operation performed for a first active data element of said at least one vector register in a predetermined sequence, the processing circuitry is to perform a response action, and when the exceptional condition is detected for the load operation performed for an active data element other than said first active data element in said predetermined sequence, the processing circuitry is to suppress said response action and store element identifying information identifying the active data element for which the exceptional condition is detected; and in response to detecting the source loop, generating instructions for an unrolled loop comprising fewer iterations than the source loop, wherein each iteration of the unrolled loop corresponds to at least two iterations of the source loop and comprises:

a vector load instruction of said first type; and at least one vector load instruction of a second type having an encoding indicating that when the exceptional condition is detected for the load operation for the load operation performed for any active data element of said at least one vector register, the processing circuitry is to suppress said response action and to store the element identifying information identifying the active data element for which the exceptional condition is detected.

(22) A data processing apparatus configured to perform the method of clause (21).

(23) The data processing apparatus according to clause (22), wherein the data processing apparatus comprises said processing circuitry configured to execute the instructions generated according to said method.

(24) A computer program comprising instructions for controlling a computer to perform the method of clause (21).

(25) A storage medium storing the computer program of clause (24).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:

processing circuitry to perform, in response to a vector load instruction, load operations to load data from a data store to a plurality of data elements of at least one vector register, wherein the vector load instruction identifies a contiguous block of addresses, and for each data element of the at least one vector register, the load operation comprises loading data to that data element from storage locations in the data store corresponding to a respective portion of the contiguous block of addresses; wherein:

in response to a first type of vector load instruction, when an exceptional condition is detected for the load operation performed for a first active data element of said at least one vector register in a predetermined sequence, the processing circuitry is configured to perform a response action, and when the exceptional condition is detected for the load operation performed for an active data element other than said first active data element in said predetermined sequence, the processing circuitry is configured to suppress said response action and to store element identifying information identifying the active data element for which the exceptional condition is detected; and in response to a second type of vector load instruction, when said exceptional condition is detected for the load operation for any active data element of said at least one vector register, the processing circuitry is configured to suppress said response action and to store the element identifying information identifying the active data element for which the exceptional condition is detected;

wherein the first type of vector load instruction and the second type of vector load instruction are distinguished by their instruction encoding;

the first type of vector load instruction specifies a base register and an offset register, and in response to the vector load instruction of the first type, the processing circuitry is configured to determine the start address of the contiguous block of addresses with a value equivalent to a result of adding a base address stored in the base register to an offset value determined based on a value stored in the offset register; and the second type of vector load instruction specifies a base register and an immediate offset value, and in response to the vector load instruction of the second type, the processing circuitry is configured to determine the start address of the contiguous block of addresses with a value equivalent to a result of adding a base address stored in the base register to a product of the immediate offset value and a multiplier corresponding to a size of said contiguous block of addresses.

2. The apparatus according to claim 1, wherein in response to the vector load instruction of the first type or the second type, the processing circuitry is configured to perform the load operation for at least one active data element of said at least one vector register before an associated condition for determining whether the load operation should be performed for the at least one active data element has been resolved.

3. The apparatus according to claim 1, wherein the vector load instruction identifies a mask indicating which data elements of said at least one vector register are active data elements.

4. The apparatus according to claim 3, the processing circuitry is responsive to at least one further instruction to generate, based on the element identifying information, at least one of a new mask and a new address for a subsequent attempt to execute a vector load instruction of the first type.

5. The apparatus according to claim 1, wherein the element identifying information comprises an element identifying mask comprising a plurality of indications each corresponding to one of the data elements of the at least one vector register, wherein indications corresponding to the active data element for which the exceptional condition is detected and any subsequent active data element in the predetermined sequence have a first value, and indications corresponding to any data elements earlier in the predetermined sequence than said active data element for which the exceptional condition is detected have a second value.

6. The apparatus according to claim 1, wherein the first active data element in the predetermined sequence comprises a least significant active data element of the at least one vector register.

7. The apparatus according to claim 1, wherein when the first type of vector load instruction specifies a predetermined register as the offset register, the processing circuitry is configured to determine the offset value as zero.

8. An apparatus comprising:
processing circuitry to perform, in response to a vector load instruction, load operations to load data from a data store to a plurality of data elements of at least one vector register; wherein:
in response to a first type of vector load instruction, when an exceptional condition is detected for the load operation performed for a first active data element of said at least one vector register in a predetermined sequence, the processing circuitry is configured to perform a response action, and when the exceptional condition is detected for the load operation performed for an active data element other than said first active data element in said predetermined sequence, the processing circuitry is configured to suppress said response action and to store element identifying information identifying the active data element for which the exceptional condition is detected; and
in response to a second type of vector load instruction, when said exceptional condition is detected for the load operation for any active data element of said at least one vector register, the processing circuitry is configured to suppress said response action and to store the element identifying information identifying the active data element for which the exceptional condition is detected;
wherein the first type of vector load instruction and the second type of vector load instruction are distinguished by their instruction encoding;
the vector load instruction identifies a contiguous block of addresses, and for each data element of the at least one vector register, the load operation comprises loading data to that data element from storage locations in the data store corresponding to a respective portion of the contiguous block of addresses;
both the first and second types of vector load instruction specify a base register and an immediate offset value;
in response to the vector load instruction of the first type or the second type, the processing circuitry is configured to determine the start address of the contiguous block of addresses with a value equivalent to a result of adding a base address stored in the base register to a product of the immediate offset value and a multiplier corresponding to a size of said contiguous block of addresses;

for the vector load instruction of the first type, the immediate offset value is zero; and
for the vector load instruction of the second type, the immediate offset value is non-zero.

9. The apparatus according to claim 1, wherein the exceptional condition comprises an address translation fault or memory permission fault.

10. The apparatus according to claim 1, wherein the response action comprises triggering execution of an exception handling routine.

11. A data processing method comprising:
in response to a vector load instruction, performing load operations to load data from a data store to a plurality of data elements of at least one vector register, wherein the vector load instruction identifies a contiguous block of addresses, and for each data element of the at least one vector register, the load operation comprises loading data to that data element from storage locations in the data store corresponding to a respective portion of the contiguous block of addresses;
when the vector load instruction is of a first type and an exceptional condition is detected for the load operation performed for a first active data element of said at least one vector register in a predetermined sequence, performing a response action;
when the vector load instruction is of the first type and the exceptional condition is detected for the load operation performed for an active data element other than said first active data element in said predetermined sequence, suppressing said response action and storing element identifying information identifying the active data element for which the exceptional condition is detected; and
when the vector load instruction is of a second type and the exceptional condition is detected for the load operation for any active data element of said at least one vector register, suppressing said response action and storing the element identifying information identifying the active data element for which the exceptional condition is detected;
wherein the first type of vector load instruction and the second type of vector load instruction are distinguished by their instruction encoding;
the first type of vector load instruction specifies a base register and an offset register, and in response to the vector load instruction of the first type, the processing circuitry is configured to determine the start address of the contiguous block of addresses with a value equivalent to a result of adding a base address stored in the base register to an offset value determined based on a value stored in the offset register; and
the second type of vector load instruction specifies a base register and an immediate offset value, and in response to the vector load instruction of the second type, the processing circuitry is configured to determine the start address of the contiguous block of addresses with a value equivalent to a result of adding a base address stored in the base register to a product of the immediate offset value and a multiplier corresponding to a size of said contiguous block of addresses.

12. A non-transitory storage medium storing a computer program for controlling a computer to provide a virtual machine execution environment corresponding to the apparatus according to claim 1.

* * * * *